United States Patent [19]
Hoshino

[11] Patent Number: 5,563,395
[45] Date of Patent: Oct. 8, 1996

[54] CARD TYPE STORAGE MEDIUM AND CARD TYPE STORAGE MEDIUM ISSUING APPARATUS

[75] Inventor: Masao Hoshino, Kawasaki, Japan

[73] Assignee: Fujitsu Limited, Kawasaki, Japan

[21] Appl. No.: 525,003

[22] Filed: Sep. 8, 1995

Related U.S. Application Data

[62] Division of Ser. No. 330,741, Oct. 28, 1994, Pat. No. 5,506,397.

[30] Foreign Application Priority Data

Feb. 25, 1994 [JP] Japan ................................. 6-028212

[51] Int. Cl.$^6$ ....................................................... G06K 5/00
[52] U.S. Cl. ....................................................... 235/380
[58] Field of Search ................................. 235/380, 375, 235/487, 492, 382; 395/600, 650, 725

[56] References Cited

U.S. PATENT DOCUMENTS

| | | | |
|---|---|---|---|
| 4,734,568 | 3/1988 | Watanabe | 235/487 X |
| 4,801,787 | 1/1989 | Suzuki | 235/382 X |
| 4,831,245 | 5/1989 | Ogasawara | 235/380 X |
| 4,882,474 | 11/1989 | Anderl et al. | 235/380 |
| 5,285,200 | 2/1994 | Kuriyama | 235/380 X |
| 5,400,082 | 3/1995 | Kamiya | 348/619 |
| 5,408,082 | 4/1995 | Takagi et al. | 235/380 X |

*Primary Examiner*—Donald T. Hajec
*Assistant Examiner*—Le Thien Minh
*Attorney, Agent, or Firm*—Nikaido, Marmelstein, Murray & Oram LLP

[57] ABSTRACT

A card type storage medium which can solve inconvenience to owners of the card type storage medium upon PIN verification or data restoration, and a card type storage medium issuing apparatus which issues such card type storage medium. The card type storage medium comprises a storage unit holding a file area including a dedicated file served to hold PINs and file names of data files stored in a directory area in the storage unit such that the PIN and file name of each data file correspond to each other. Said card type storage medium holds control information including a master PIN for the dedicated file in the directory area in the storage unit. A recovery information unit is additionally provided in a data file in the file area in the storage unit, which holds recovery information obtained every time the data file is updated. This card type storage medium is applicable to, for example, an IC card.

43 Claims, 17 Drawing Sheets

FIG.13A (IMMEDIATELY AFTER THE ISSUE)

| START SERIAL NUMBER | END SERIAL NUMBER | RESTORATION DATA | | | CHECK SERIAL NUMBERS |
|---|---|---|---|---|---|
| 1 | 00000000 | 00000000 | 00000000 | 00000000 | 1 |
| 1 | 00000000 | 00000000 | 00000000 | 00000000 | 1 |
| 1 | 00000000 | 00000000 | 00000000 | 00000000 | 1 |
| 1 | 00000000 | 00000000 | 00000000 | 00000000 | 1 |
| 1 | 00000000 | 00000000 | 00000000 | 00000000 | 1 |
| 1 | 00000000 | 00000000 | 00000000 | 00000000 | 1 |

FIG.13B (FIRST TIME)

| 2 | 00000001 | 2 |
| --- | --- | --- |
| 2 | 00000001 | 2 |
| 2 | #10,3030 | 2 |
| 2 | #08,F1F1 | 2 |
| 2 | #11,1010 | 2 |
| 1 | 00000000 | 1 |

□ (APPLICATION)
OPEN
WRITE #10,--
WRITE #08,--
WRITE #11,--
CLOSE

FIG.13C (SECOND TIME)

| 3 | 00000002 | 3 |
| --- | --- | --- |
| 3 | 00000002 | 3 |
| 3 | #02,4040 | 3 |
| 1 | 00000000 | 1 |
| 1 | 00000000 | 1 |
| 1 | 00000000 | 1 |

□ (APPLICATION)
OPEN
WRITE #02,--
WRITE #02,--
CLOSE

FIG. 16A (STATE IN THE EVENT OF A SYSTEM FAILURE)

| | | |
|---|---|---|
| #01 | 1212 | |
| #02 | 2222 | |
| #03 | 3333 | |
| #04 | 4242 | |
| #05 | 5252 | |
| --- | --- | |
| #n | | |
| #n+1 | 4 00000004 | 4 |
| | 3 00000003 | 3 |
| | 4 #03,3232 | 4 |
| | 4 #02,2222 | 1 |

814 {#01–#n}
815 {#n+1 ...}
812: DATA FILE

FIG. 16B (AFTER DATA RECOVERY)

APPLICATION AREA (STATE BEFORE THE SYSTEM FAILURE)

| | | |
|---|---|---|
| #01 | 1212 | |
| #02 | 2222 | |
| #03 | 3232 | |
| #04 | 4242 | |
| #05 | 5252 | |
| --- | --- | |
| #n | | |
| #n+1 | 4 00000004 | 4 |
| | 3 00000003 | 3 |
| | 4 #03,3232 | 4 |
| | 4 #02,2222 | 1 |

815 RECOVERY INFORMATION UNIT
812: DATA FILE

CARD TYPE STORAGE MEDIUM AND CARD TYPE STORAGE MEDIUM ISSUING APPARATUS

This is a division of application Ser. No. 08/330,741 filed Oct. 28, 1994, now U.S. Pat. No. 5,506,397.

BACKGROUND OF THE INVENTION

1. Field of the Invention

The present invention relates to a card type storage medium such as an IC card used as a cashless card, an identification (I.D.) card, a health management card, a municipal corporation card, etc. and an issuing apparatus issuing such card type storage medium.

2. Description of the Related Art

A card type storage medium, for example, an IC card having an integrated circuit therein has been widely spread in recent years.

A file controlling program is set into the IC card to retain data therein so that the data to be processed by an external application program that is incorporated within a terminal apparatus, a host computer or the like can be managed in each file as a unit.

Referring to FIG. 17, a typical IC card 100 comprises a terminal (a contact or a data communication mechanism) 110, a storage 120 and a control unit 130.

When the IC card 100 is inserted into an IC card reader/writer (not shown) of a terminal apparatus, a host computer or the like, the terminal 110 is brought into contact with a terminal of the IC card reader/writer to send and receive a signal.

The storage 120 has a file area in which data to be processed by each various application program is retained in each file, and a directory area 123 which retains control information about each data file 122 held in the file area 121.

The control unit (MPU: micro processor unit) 130 is to manage the data retained in the file area 121 in the storage unit 120 on the basis of the control information stored in the directory area 123 in the storage unit 120.

Some IC card has an electric source therein, and some IC card needs to be supplied an electric energy from a terminal apparatus or a host computer by being inserted into the terminal apparatus or the host computer. In the latter case, a nonvolatile storage such as an EEPROM is used as the storage unit 120.

Such IC card 100 is used as a cashless card, an ID card, a health management card, a municipal corporation card, etc.

In department stores, super markets, etc., a system has been accomplished with employment of a cashless card such as a prepaid card or a credit card for sales promotion. If the IC card is used as such cashless card, it is essential to provide a function for advance payment or future payment to the cashless card, for example, the prepaid card or the credit card.

If the IC card 100 is used as an ID card to improve convenience in, for example, an intelligent building, the IC card needs to have a function to hold data about entrance and retrieval to and from the room, attendance of employees, etc. in the data files 122.

If the IC card 100 is used as a health management card in a hospital, a fitness facility or the like to improve convenience, the IC card 100 has to hold various data such as appointment, carte, results of examination and measurement for the management.

Likewise, if the IC card 100 is used as a municipal corporation card to improve use of public facilities or administrative service, the IC card holds data about appointment of the facilities, automatic issue of various applications as data files 122 therein.

The IC card 100 shown in FIG. 17 has predetermined personal identification number (hereinafter, referred as PIN) for every data file 122 retained in the storage unit 120 in order to reinforce the security of the data retained in the IC card 100. Each of the PIN is held as control information in the directory area 123 in the storage unit 120.

In order to gain an access from an external application or the like, only when a PIN sent with the access is in coincidence with the PIN retained in the directory area 123 in the storage unit 120, the control unit 130 allows reading or updating of the data retained in the data file 122.

The PIN for each data file 122 is set when the IC card 100 is issued by a card issuing apparatus (not shown). Management of the PIN set by the card issuing apparatus, which varies from each other depending on a card owner, is carried out by another host computer (not shown) different from the card issuing apparatus.

If a person owing the IC card accidentally forgets a PIN of his or her own IC card 100, the PIN is read out from the host computer managing the PIN through a terminal apparatus which can gain an access to the host computer to verify the PIN.

The host computer manages the PINS of the owners of all issued IC cards (card type storage media) 100. In addition, it is sometimes necessary to set plural different PINs to every data files in each IC card. The host computer therefore requires a large area in the storage to manage the PINs. The management of the PINs is, therefore, quite complex and troublesome to the entire IC card system. Moreover, in the event of an accident, use of a terminal apparatus accessible to the host computer is indispensable to verify the IC card. Such verification of the IC card causes inconvenience to users of the IC card.

Meanwhile, a card type storage medium, which is used ahead of an IC card, for example, a magnetic card, is operated in a mode where the stored data is unchangeable as personal identification information (ID). An IC card 100 as above is used in a mode where stored data (for example, information about an amount of money) is variable, as represented by a cashless card.

In such mode of use, the IC card is used as a cashless card. In the event of an accident such as system down, power-source break-down, pull-out of the IC card 100 in the course of an updating process to receive money or for account settlement, a failure may develop in data in the data file 122 in the IC card 100. At present, it is impossible to repair or restore (data recovery) such failure in data within the IC card 100.

To cope with such event, a presently conducted technique is to set an area of 1 byte referred as BCC (block check character) in each record of data held in the data file 122 of the IC card 100, adjust the BCC such that a bit number in each record becomes an even number or an odd number and write the BCC in each record to make a check on the bit number in each record as to whether the bit number is an even number or an odd number upon reading out the data. For instance, in the case where the BCC is so adjusted that the bit number in each record is an even number, if the bit number in the record is an odd number upon checking, some action is taken upon check-out such as to prohibit the IC card 100 from being used.

It is, however, impossible to detect a system failure as conflicting data developed between the records by such BCC check, as shown in FIG. 18.

Namely, in the case where data writing and updating are executed a plurality of times (three times in FIG. 18) as one unit of process in the course from an open to close of the IC card 100 by the application program 200 of an external terminal apparatus or the like, if a system failure occurred before the second updating after the first record was updated, it is impossible to detect the system failure by the BCC since no conflict occurred in data as a record unit held in the IC card 100.

Since the BCC checks a number of bits by a record unit, if 2 bits (an even bit) are left out, or the number of bits are the same but their represented value are different (for example, "0111" and "1011", if three bits), it is impossible to detect such failure as conflicting data.

In consequence, for example, as shown in FIG. 19, if a system failure occurred while one record is being written into the IC card 100, causing a situation that there exist an updated part and an unupdated part within the same record, there is possibility that such failure cannot be detected.

To solve the above problem, it is necessary to provide a BCC in each record in the file area 121 of the storage unit 120. This results in that a large area is required for the BCCs, if a large volume of data need to be stored in the card.

As stated above, there has been developed no technique to repair and restore data failure (data recovery) within the IC card 100. If such repair and restore are handled on the side of the apparatus, the host computer needs to manage recovery information (restoration data and the like) of all IC cards every time the IC card is used. As a result, it is necessary to execute the recovery on data conflict by (1) communicating with the host computer in real time to restore the data, or (2) prohibiting the IC card from being used, and issuing a new card.

To cope with the above problem, the conventional IC card has disadvantages such that a configuration of the IC card system become difficult, a large area is required to store recovery information in the storage of the host computer, and management of the entire IC card system becomes quite complex, as same as the PIN management. Further, to repair and restore the data in the IC card 100 in the event of a system failure, it is necessary to use a terminal apparatus accessible to the host computer, or to reissue the IC card. Such data recovery work is quite troublesome to the card user.

SUMMARY OF THE INVENTION

From the above viewpoint, an object of this invention is to provide a card type storage medium and a card type storage medium issuing apparatus, in which management of PINs heretofore carried out by a host computer becomes dispensable, the PIN management in the entire system is simplified, and verification of a PIN in an event of an accident is easily and simply carried out so that inconvenience to users may be mitigated upon verification of the PIN.

Another object of this invention is to provide a card type storage medium which can detect reliably conflicting data developed due to a system failure without using a BCC, and to realize repair and restore of the conflicting data developed due to a system failure by and within the card itself, thereby simplifying the apparatus configuration and reducing inconvenience to the users upon restoring the data.

The present invention therefore provides a card type storage medium comprising a storage unit having a file area holding data in each file as a unit and a directory area holding therein control information units each including a PIN of a data file in said file area in said storage unit on the basis of said control information units in said directory area in said storage unit, said control unit allowing an access process on a data file only when a PIN held in said control information unit in said directory area in said storage unit is in agreement with a PIN fed from outside, the improvement comprising a dedicated file being set in said file area in said storage unit, said dedicated file holding PINs of the data files held in said respective control information units in said directory area in said storage unit and file names of the data files such that the PIN and file name of each data file correspond to each other, another control information unit being set in said directory area in said storage unit, said control information unit holding a master PIN of said dedicated file.

According to the above card type storage medium of this invention, a dedicated file is provided in a file area in the storage unit to hold data including PINs and files names of the respective data files. It is, therefore, possible to manage the PINs retained in each card type storage medium by and within the card type storage medium itself. It is also possible to omit PIN management by the host computer, largely reducing a burden of the PIN management on the entire system.

As another aspect, the present invention also provides a card type storage medium issuing apparatus issuing the above card type storage medium comprising the storage unit and the control unit, said card type storage medium issuing apparatus comprising a data file creating means, in response to a data file creating command from outside, setting a control information unit for a data file including a PIN of said data file to create said data file in said file area in said storage unit according to said data file creating command, a PIN matching means, in response to a data file accessing command to gain an access to the data file created by said data file creating means from the outside, making a judgement as to whether the PIN of said data file to be accessed according to said data file access command held in said control information unit in said directory area in said storage unit is in agreement with a PIN included in said data file accessing command supplied from the outside, a data file accessing means executing an access process on the data file to be accessed when said PIN matching means judges that said two PINs are in agreement, a dedicated file creating means, in response to a dedicated file creating command from the outside, setting a control information unit for said dedicated file including a master PIN for said dedicated file to create said dedicated file in said file area in said storage unit according to said dedicated file creating command, a master PIN matching means, in response to a dedicated file access command to gain an access to said dedicated file created by said dedicated file creating means from the outside, making a judgement as to whether the master PIN of said dedicated file held in said control information unit in said directory area in said storage is in agreement with a master PIN included in said dedicated file access command supplied form the outside, and a dedicated file access means executing an access process on said dedicated file when said master PIN matching means makes a judgement that the above two master PINs are in agreement, upon issuing said IC card, said dedicated file accessing means writing the PINs of the data files held in said respective control information units in said directory area in said storage unit into said dedicated file such that the PIN and file name of each data file corresponds to each other according to a dedicated file accessing command supplied from outside after said dedicated file creating means created said dedicated file.

In the above card type storage medium issuing apparatus of this invention, upon issuing the IC card, said dedicated file creation instructing means first transfers a dedicated file creating command. Said dedicated file access instructing means then generates a dedicated file access command including data including PINs and file names of the respective data files and transfers it to said card type storage medium, thereby setting a dedicated file holding data including the PINs and file names of the respective data files such that a PIN and file name of each data file correspond to each other in the file area in the storage unit of the card type storage medium. It is, therefore, possible to manage the PINs of each card type storage medium by and within the card type storage medium itself. The management of the PINs by the host computer thus can be omitted, largely reducing a burden to manage the PIN on entire system.

The card type storage medium according to this invention comprising a storage unit having a file area holding data by file therein and a directory area holding control information about each data file in said file area therein and a control unit managing data in said area on the basis of said control information in said directory area in said storage unit, said card type storage medium executing updating on a data file by said control unit in response to an instruction from outside. A recovery information unit is additionally provided in the data file in said file area in said storage unit, into which recovery information obtained every time said control unit updates the data file is written. A start serial number obtained when a data file is opened and an end serial number obtained when the data file is closed are written into said recovery information unit as recovery information.

As still another aspect, the card type storage medium of this invention comprising a storage unit and a control unit, said control unit comprising a data file opening means opening, in response to a data file opening instruction supplied form outside, a data file in said file area in said storage unit on the basis of the control information in a directory area in said storage unit after the data file has been opened, a data file updating means updating, in response to a data file updating instruction supplied from the outside, data in a data file opened by said data file opening means, and a data file closing means closing, in response to a closing instruction supplied from the outside, the data file opened by said data file opening means after the data file has been opened. A recovery information unit is additionally provided in the data file in said file area in said storage unit, into which recovery information obtained every time said control unit updates the data file. The control unit further comprises a start serial number obtaining means obtaining a start serial number when said data file opening means opens a data file to write it into said recovery information unit, and an end serial number obtaining means obtaining an end serial number every time said data file closing means closes a data file to write it into said recovery information unit as recovery information.

According to the card type storage medium according to this invention, it is possible to detect that a system failure occurred between an open and close of a data file, by comparing the start serial number with the end serial number held in the recovery information unit.

BRIEF DESCRIPTION OF THE DRAWINGS

FIGS. 13A through 13C are illustrations of a content of data in the recovery information unit in order to explain an operation of the card type storage medium according to the second embodiment;

FIGS. 16A and 16B are illustrations of a content of data in the application area and the recovery information unit in order to explain the operation of the card type storage medium according to the second embodiment;

DETAILED DESCRIPTION OF THE PREFERRED EMBODIMENT

1. Description of Aspects of This Invention

Figure 1:
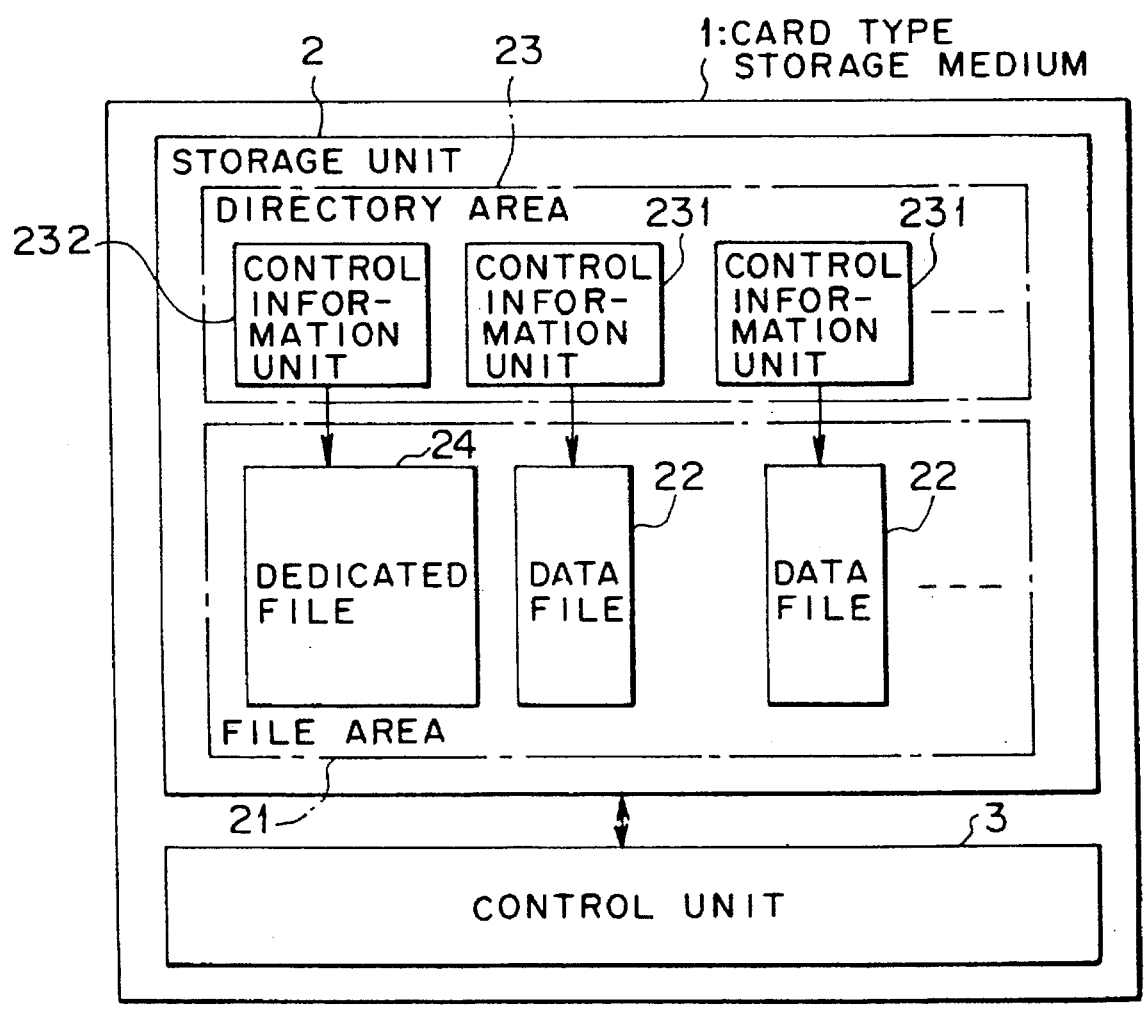
FIG. 1 is a block diagram illustrating an aspect of this invention.

FIG. 1 is a block diagram illustrating an aspect of this invention. In FIG. 1, reference numeral 1 denotes a card type storage medium. The card type storage medium 1 comprises a storage unit 2 and a control unit 3.

The storage unit 2 includes a file area 21 holding data in each file as a unit and a directory area 23 having a control information unit 231 to hold a PIN for each data file 22 in the file area 21 therein.

The control unit 3 is to manage the data files 22 in the file area 21 in the storage unit 2 on the basis of data held in the control information units 231 in the directory area 23 in the storage unit 2. In this card type storage medium 1, only when the PIN held in the control information unit 231 in the directory area 23 in the storage unit 2 agrees with a PIN fed from outside, the control unit 3 permits the data files to be accessed.

In the file area 21 in the storage unit 2 of this card type storage medium 1, there is provided a dedicated file 24 to hold PINs and file names of the data files 22 such that each of the PIN corresponds to its file name of the data file 22 that is retained in the control information units 231 in the directory area 23 in the storage unit 2. Likewise, there is provided another control information unit 232 to hold a master PIN (i.e., a PIN that only the system manager knows) for the dedicated file 24 in the director area 23 in the storage unit 2.

It is possible to encipher the PINs of the data files 22 and hold them in the dedicated file 24.

In the card type storage medium shown in FIG. 1, the data of the PINs for the respective data files 22 and the corresponding file names are set in the dedicated file 24. The PINs in each card type storage medium are therefore managed by and within the card type storage medium itself. As a result, the-management of the PINs by the host computer is dispensable.

The data in the dedicated file 24 cannot be read out without an input of the master PIN (that is known by only the system manager) held in the control information unit 232 in the directory area 23. The enciphered PINs for the respective data files 22 in the dedicated file 24 can more effectively prevent the PINs for the respective data files 22 from being known by other persons except the system manager, if the master PIN gets to be known by the other person.

Figure 2:
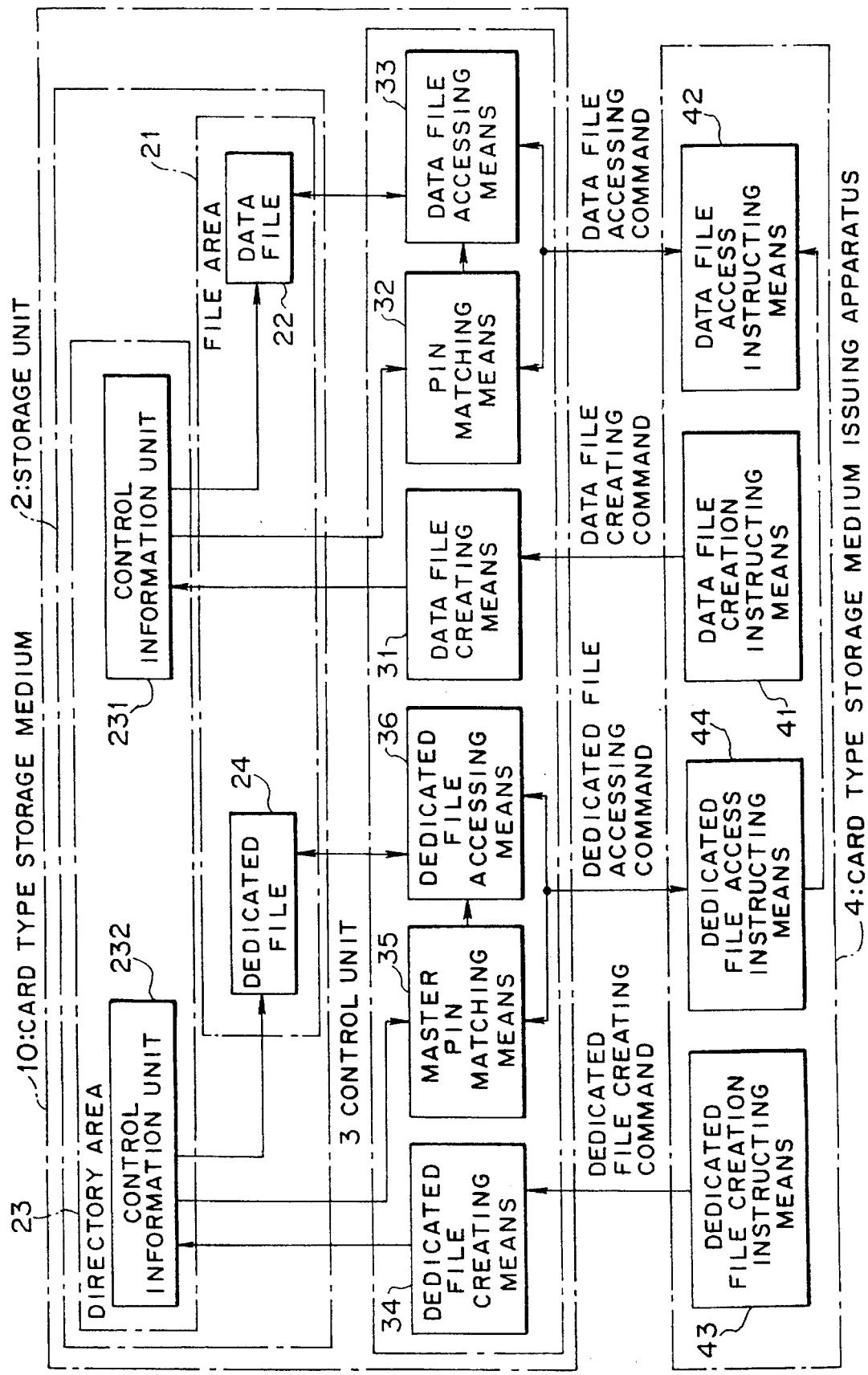
FIG. 2 is a block diagram illustrating another aspect of this invention.

FIG. 2 is a block diagram illustrating another aspect of this invention. In FIG. 2, reference numeral 10 denotes a card type storage medium. The card type storage medium 10 has a similar configuration to the card type storage medium shown in FIG. 1, essentially comprising a storage unit 2 and a control unit 3.

The storage unit 2 has, as similar to that shown in FIG. 1, a file area 21 retaining data in each file as a unit and a directory area 23 including control information units 231 each retaining a PIN for a data file 22 in the file area 21 therein.

The control unit 3 is, as also similar to the one shown in FIG. 1, to manage the data files 22 in the file area 21 in the storage unit 2 on the basis of the data held in the control information units 231 in the directory area 23 in the storage unit. The control unit 3 shown in FIG. 2 is provided with a data file creating means 31, a PIN matching means 32, a data file accessing means 33, a dedicated file creating means 34, a master PIN matching means 35 and a dedicated file accessing means 36.

When receiving a data file creating command from the outside (i.e., a card type storage medium issuing apparatus 4 described later), the data file creating means 31 sets the control information unit 231 for the data file 22 containing a PIN for the data file 22 in response to the data file creating command in order to create said data file 22 in the file area 21 in the storage unit 2.

When receiving a data file access command to gain an access to the data file 22 created by the data file creating means 31 from the outside, the PIN matching means 32 makes a judgement as to whether a PIN included in the above data file accessing command agrees with the PIN of the data file 22 to be accessed held in the control information unit 231 in the directory area 23 in the storage unit 2.

The data file accessing means 33 is to gain an access to the data file 22 to be accessed when a result of the matching carried out by the PIN matching means 32 is positive.

When receiving a dedicated file creating command from the outside (i.e., the card type storage means issuing apparatus 4 described later), the dedicated file creating means 34 sets a control information unit 232 for a dedicated file 24 including a master PIN (known only by the system manager) for the dedicated file 24 in the directory area 23 in the storage unit 2 in response to the dedicated file creating command in order to create the dedicated file 24 in the file area 21 in the storage unit 2.

When receiving a dedicated file access command to gain an access to the dedicated file 24 created by the dedicated file creating means 34 from the outside (i.e., the card type storage medium issuing apparatus 4 described later), the master PIN matching means 35 makes a judgement as to whether the master PIN of the dedicated file 24 retained in the control information unit 232 in the directory area 23 in the storage unit 2 agrees with a master PIN contained in the inputted dedicated file access command.

When a result of the matching between the above two master PINs carried out by the master PIN matching means 35 is positive, the dedicated file accessing means 36 allows an access to the dedicated file 24.

Upon issuing the card type storage medium 10 of this invention, the dedicated file creating means 34, to begin with, creates the dedicated file 24. The dedicated file access means 36 next writes PINs of the respective data files 22 retained in the control information in the directory area 23 in the storage unit 2 into the dedicated file 24 such that each of the PIN of the data file 22 corresponds to its file name, in response to the dedicated file access command supplied from the outside (tile card type storage medium issuing apparatus 4, described later).

It is possible to encipher the PINs for the data files 22 and hold them in the dedicated file 24.

In FIG. 2, reference numeral 4 denotes the card type storage medium issuing apparatus. The card type storage medium issuing apparatus 4 issues the card type storage medium 10 (or a card type storage medium 1) as described hereinbefore, comprising a data file creation instructing means 41, a data file access instructing means 42, a dedicated file creation instructing means 43 and a dedicated file access instructing means 44.

The data file creation instructing means 41 sets a control information unit 231 of the data file 22 including a PIN for the data file 22 in the directory area 23 in the storage unit 2. The data file creation instructing means 41 then generates a data file creating command including the PIN, and transmit the generated data file creating command to the card type storage medium 10 (i.e., the data file creating means 31) in order to create the data file 22 in the file area 21 in the storage unit 2.

The data file access instructing means 42 generates a data file access command including a PIN for the data file 22 to be accessed, and transmits the generated data file accessing command to the card type storage medium 10 (i.e., the PIN number matching means 32 and the data file access means 32) in order to get an access to the data file 22 created in the file area 21 in the storage unit 2.

The dedicated file creation instructing means 43 sets the control information unit 232 for the dedicated file 24 including a master PIN for the dedicated file 24 in the directory area 23 in the storage unit 2. The dedicated file creation instructing means 43 generates a dedicated file creating command including the master PIN, and transmits the generated dedicated file creating command to the card type storage medium 10 (i.e., the dedicated file creating means 34) in order to create the dedicated file 24 in the file area 21 in the storage unit 2.

The dedicated file access instructing means 44 generates a dedicated file access command including the master PIN for the dedicated file 24, and transmits the generated dedicated file access command to the card type storage medium 10 (i.e., the master PIN matching means 35 and the dedicated file accessing means 36) in order to gain an access to the dedicated file 24 created in the file area 21 in the storage unit 2.

In the card type storage medium issuing apparatus 4, the dedicated file creating means 43 transfers a dedicated file creating instructing command to the card type storage medium 10 when the card type storage medium 10 is issued. Thereafter, the dedicated file access instructing means 44 generates a dedicated file access command including data of file names and PINs of the respective data files 22, and transfers it to the card type storage medium 10 (i.e., the dedicated file access means 36) in order to write the PINs of the data files 22 such that the PIN of each data file 22 corresponds to its file name that is retained in the control information unit 231 in the directory area 23 in the storage unit 2.

It is possible that, upon verification of PINs of the card type storage medium, the dedicated file access instructing means 44 of the card type storage medium issuing apparatus 4 generates a dedicated file accessing command including a master PIN, and transfers it to the card type storage medium 10 (i.e., the master PIN matching means 35 and the dedicated file accessing means 36) in order to read out data from the dedicated file 24 in the file area 21 in the storage unit 2 in the card type storage medium 10 to be verified.

When the data of the PIN and the file name of the data file 22 is read out from the dedicated file 24 in the card type storage medium 10 in response to the dedicated file accessing command from the dedicated file access instructing means 44 of the card type storage medium issuing apparatus 4, the data file access instructing means 42 generates a data file accessing command including the PIN read out, and transfers it to the card type storage medium 10 (i.e., the PIN matching means 32 and the data file access means 33) to give an instruction to the card type storage medium 10 to verify the correctness of the data file 22 corresponding to the PIN read out.

In the case where enciphered PINs of data files are held in the dedicated file 24, there are also provided an enciphering means enciphering the PINs of the data files 22 to be written into the dedicated file 24 in the card type storage medium 10 by the dedicated file access directing means 44, and a decoding means decoding the enciphered PINs of the data files 22 read out from the dedicated file 24 in the card type storage medium 10 from the dedicated file access instructing means 44.

In the card storage medium 10 set forth above in connection with FIG. 2, the data file creating means 31 sets a control information unit 231 for the data file 22 including a PIN in the directory area 23 in the storage unit 2 in response to a data file creating command from the card type storage medium issuing apparatus 4.

When receiving a data file accessing command to access a data file 22 created by the data file creating means 31 from the outside, the PIN matching means 32 makes a judgement as to whether the PIN included in the data file accessing command agrees with the PIN of the data file 22 (held in the control information unit 231 in the directory area 23) to be accessed.

When a result of the matching executed by the PIN matching means 32 is positive, the data file access means 33 allows an access to the data file 22 to be accessed.

In the card type storage medium 10, the dedicated file creating means 34 sets, upon issuing the card type storage medium, the control information unit 232 for the dedicated file 24 including the master PIN (i.e., the PIN known by only the system manager) in the directory area 23 in the storage unit 2, in response to the dedicated file creating command in order to create the dedicated file 24 in the file area 21 in the storage unit 2.

When receiving the dedicated file accessing command to gain an access to the dedicated file 24 created by the dedicated file creating means 34 from the card type storage medium issuing apparatus 4, the master PIN matching means 35 makes a judgement as to whether a master PIN included in the dedicated file accessing command agrees with the mater PIN (retained in the control information unit 232 in the directory area 23) of the dedicated file 24.

When a result of the matching executed by the master PIN matching means 35 is positive, the dedicated file access means 36 carries out an access process (that is, write/read) on the dedicated file 24.

When the card type storage medium 10 is issued, the dedicated file accessing means 36 writes a PIN and a file name of each data file into a dedicated file 24 in such a manner that the PIN and the file name correspond to each other in response to a dedicated file accessing command from the card type storage medium issuing apparatus 4 after the dedicated file creating means 34 has created the dedicated file 24.

In the above manner, data of the PIN and the file name of each data file 22 is written in the dedicated file 24 in the file area 21 in the storage unit 2 of the card type storage medium 10. The management of the PINs in each card type storage medium 10 is carried out by and within the card type storage medium 10 itself, management of the PINs by the host computer is thus dispensable.

The data in the dedicated file 24 cannot be read out without knowing the master PIN (the PIN known by only the system manager) retained in the control information unit 232 in the directory area 23.

Enciperment of the PINs of the data files 22 stored in the dedicated file 24 is more effective to prevent the PINs of the data files 22 from leaking outside as they are, even if the master PIN gets to be known by another person except the system manager.

The above mentioned card type storage medium issuing apparatus 4 shown in FIG. 2 issues the card type storage medium 10 (or a card type storage medium 1).

More specifically, the data file creation instructing means 41 generates a data file creating command including PINs of data files 22, and transfers it to the card type storage medium 10 (i.e., the data file creating means 31) to set the control information unit 231 for the data files 22 including the PINs for the respective data files 22 in the directory area 23 in the storage unit 2, in response to the data file creating command so that the data files 22 may be created in the file area 21 in the storage unit 2.

The data file access instructing means 42 generates a data file accessing command including a PIN for a data file 22 to be accessed, and transfers it to the card type storage medium 10 (i.e., the PIN matching means 32 and the data file accessing means 32) to perform an access process (i.e., write/read) on the data file 22 created in the file area 21 in the storage unit 2.

On the other hand, the dedicated file creation instructing means 43 generates a dedicated file creating command including a master PIN, and transfers it to the card type storage medium 10 (i.e., the dedicated file creating means 34) to set the control information unit 232 for the dedicated file 24 including the master PIN for the dedicated file 24 so that the dedicated file 24 is created in the file area 21 in the storage unit 2.

The dedicated file access instructing means 44 generates a dedicated file accessing command including the master PIN for the dedicated file 24, and transfers it to the card type storage medium 10 (i.e., the master PIN matching means 35 and the dedicated file access means 36) to perform an access process (i.e., write/read) on the dedicated file 24.

Upon issuing tile card type storage medium 10 (or the card type storage medium 1), the dedicated file creation instructing means 43, to begin with, transfers the dedicated file creating command. The dedicated file access instructing means 44 next generates a dedicated file accessing command including data of the PINs and the file names of the respective data files 22, and transfer it to the card type storage medium 10 (i.e., the dedicated file accessing means 36).

The data of the PINs and the file names of the respective data file 22 is set in the dedicated file 24 in the file area 21 in the storage unit 2 of the card type storage medium 10. The management of the PINs in the card type storage medium 10 is carried out by and within each card type storage medium 10 itself, the management of the PINs by the host computer may thus be omitted.

The data in the dedicated file 24 cannot be read out by a person not knowing the master PIN (i.e., the PIN known only by the system manager) retained in the control information unit 232 in the directory area 23.

In the event of an accident, the dedicated file access instructing means 44 generates a dedicated file access command including the master PIN, and transfers it to the card type storage medium 10 (i.e., the master PIN matching means 35 and the dedicated file accessing means 36), whereby the card type storage medium issuing apparatus 4 can read out the data (i.e., the data of the PINs and the file names of the respective data files 22) from the dedicated file 24 in the file area 21 in the storage unit 2 of the card type storage medium 10 to verify the PINs of the card type storage medium 10.

When the data of the PINs and the file names of the data files 22 is read out from the dedicated file 24 in response to the dedicated file accessing command from the dedicated file access instructing means 44, the data file access instructing means 42 generates a data file accessing command including the PIN read out, and transfers it to the card type storage medium 10 (i.e., the PIN matching means 32 and the data file accessing means 33) to verify the correctness of the data file 22 corresponding to the PIN.

It is possible to encipher PINs of the data files to be written in the dedicated file 24 by the dedicated file access instructing means 44, and decipher the enciphered PINs read out from the dedicated file 24 by the dedicated file access instructing means 44. The dedicated file can therefore hold the enciphered PINs for the respective data files 22. If the master PIN is known by another person except the system manager, the enciphered PINs of the data files are securely prevented from being known as they are.

According to this invention, since the PINs of the data files 22 and their file names are held in the dedicated file 24 in the file area 21 in the storage unit 2 of the card type storage medium 1 or 10 in such a manner that the PIN and the file name of each data file 22 correspond to each other, as stated above. Therefore, each card type storage medium 1 or 10 can manage the PINs by and within the card type storage medium itself, the management of the PINs by the host computer becomes thus dispensable and the burden to manage the PINs in the entire system can be largely reduced.

The data in the dedicated file 24 is exhibited to be read out without use of the mater PIN known by only the system manager. Moreover, the enciphered PINs of the respective data files 22 held in the dedicated file 24 can be effectively prevented from being known as they are by the other person, even if the master PIN gets to be known by the other person except the system manager. In which case, it is impossible to decipher the enciphered PINs as long as the manner of the enciperment is in secret. This can surely prevent the PINs from leaking outside, causing no trouble in security, even if the card type storage medium 1 or 10 manages the PINs therein.

Also according to this invention, when the card type storage medium issuing apparatus 4 issues the card type storage medium 1 or 10, the dedicated file creation instructing means 43 transfers a dedicated file creating command, the dedicated file access instructing means 44 then generates a dedicated file accessing command including data of the PINs and file names of the respective data files 22 to transfer it to the card type storage medium 1 or 10, whereby a dedicated file 24 holding the PINs and tile file names of the respective data files 22 therein can be set so that the card type storage medium 1 or 10 can manage the PIN by itself. This can omit the management of the PINs by the host computer, largely simplifying the PIN management in the entire system. The data in the dedicated file 24 cannot be read out without the master PIN known by only the system manager.

In order to read out data of the PINs and the file names of the data files 22 from the dedicated file 24 of the card type storage medium 1 or 10, the dedicated file access instructing means 44 generates a dedicated file accessing command including the master PIN, and transfers it to the card type storage medium 1 or 10. In the event of an accident, it is possible to verify the PINs in the card type storage medium 1 or 10, mitigating inconvenience to the user upon verification of the PINs.

On the verification of a PIN, the data file access instructing means 44 transfers a data file accessing command to the card type storage medium in order to verify the PIN read out from the dedicated file 24. This process make it possible to verify the correctness of the data file 22 corresponding to the PIN read out, with a high reliability in the PIN verification process.

The PINs to be written into the dedicated file 24 by the dedicated file access instructing means 44 are enciphered by the enciphering means, while the enciphered PINs read out from the dedicated file 24 by the dedicated file access instructing means 44 are enciphered by the enciphering means, whereby the dedicated file 24 can hold the PINs for the respective data file 22 as ciphers. If the master PIN gets to be known by person except the system manager, it is possible to prevent the PINs of the data files from leaking out as they are. So long as the manner of the encipherment does not leak out, it is, impossible to decipher the PINs. This can prevent, with certain, the PINs from leaking outside, causing no trouble in security, even if the card type storage medium 1 or 10 manages the PIN therein.

Figure 3:
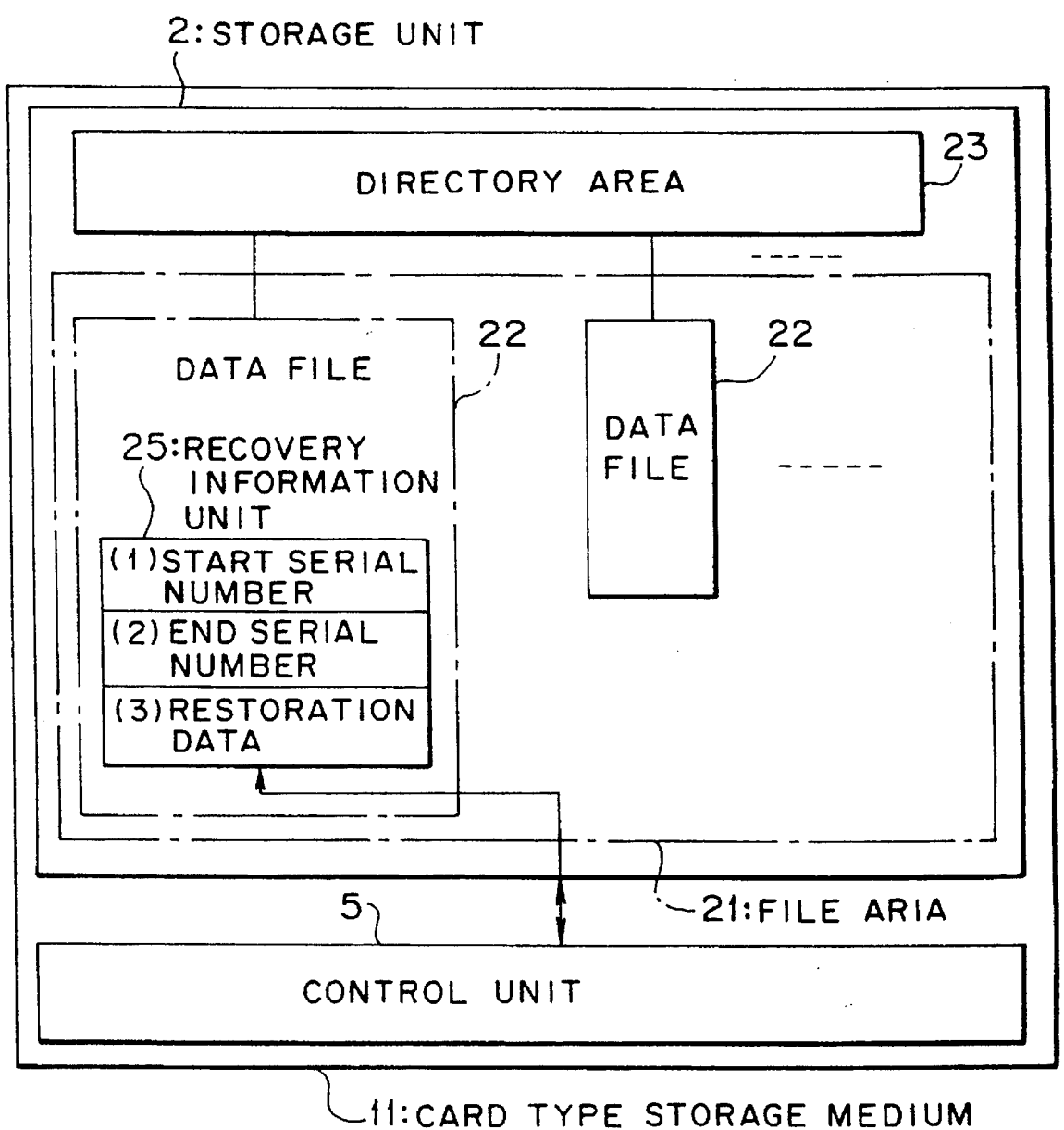
FIG. 3 is a block diagram illustrating still another aspect of this invention.

FIG. 3 is a block diagram showing another aspect of this invention. In FIG. 3, reference numeral 11 denotes a card type storage medium, comprising a storage unit 2 and a control unit 5.

The storage unit 2 has a file area 21 holding data by files therein and a directory area 23 holding control information about each data file 22 in the file area 21 therein. The control unit 5 manages data in the file area 21 in the storage unit 2 on the basis of the control information in the directory area 23 in the storage unit 2. In the card type storage medium 11, the control unit 5 updates the objective data file 22 when receiving a command from outside.

The card type storage medium 11 is additionally provided a recovery information unit 25 in the data file 22 in the file area 21 in the storage unit 2, into which recovery information obtained every time an updating operation is performed on the objective data file 22 by the control unit 5 is written. In the recovery information unit 25, there are written (1) a start serial number obtained when the objective data file 22 is opened, (2) restoration data consisting of a record number to be updated and unupdated data at the record number obtained when the data file is updated, and (3) an end serial number obtained when the data file 22 is closed.

Meanwhile, it is possible to attach check serial numbers as recovery information, before and after the start serial number, the restoration data and the end serial numbers, respectively, in the recovery information unit 25.

If the updating process is performed a plurality of times on the same record number in the course from an open to close of the objective data file 22, the restoration data is not written into the recovery information unit 25 after the second updating process and later.

It is also possible to set information about a presence of the recovery information unit 25 in the objective data file 22 and information about a relative position of the recovery information unit 25 in the objective data file 22, if the recovery information unit 25 exists, in the control information unit in the directory area 23 in the storage unit 2.

In the card type storage medium shown in FIG. 3, (1) a start serial number obtained when an objective data file 22 is opened, (2) restoration data consisting of a record number to be updated and unupdated data at the record number obtained when the objective data file 22 is updated, and (3) an end serial number obtained when the objective data file 22 is closed, are written as recovery information into the recovery information unit 25 additionally provided in the data file 22 in the file area 21 in the storage unit 2.

The start serial number in the recovery information unit 25 is compared with the end serial number. If a result of the comparison is in disagreement, it is possible to know from the result an occurrence of a system failure between an open and close of the objective data file 22, without using a BCC.

Moreover, the check serial numbers are attached before and after the start serial number, the restoration data and the end serial numbers, respectively, in the recovery information unit 25 as recovery information. The check serial numbers attached before and after the start serial number, the recovered number and the end serial number are compared with each other, respectively. If a result of the comparison is in disagreement, it is also possible to detect an occurrence of system failure in the course of writing the recovered data or the end serial number into the recovery information unit 25 so as to know the effectivity of each data stored in the recovery information unit 25.

If the same record number is updated plural times between an open and close of the objective data file 22, the restoration data obtained is not written into the recovery information unit 25 after the second updating process and later. It is therefore possible to always hold a preceding data (data before the updating) before the open of the data file 22 as restoration data at the same record number in the recovery information unit 25.

The above process enables the state inside the card type storage medium 11 after an occurrence of system failure to be effectively recovered to the state before the updating process where the system failure occurred.

By setting information as to the presence of the recovery information unit 25 in a data file and information about a relative position of the recovery information unit 25 in the objective data file 22, if the recovery information unit 25 exists, in the directory area 23 in the storage unit 2, it is possible to make a judgement as to whether a predetermined data should be written into the recovery information unit 25 or data recovery should be executed on the basis of the data stored in the recovery information unit 25.

Figure 4:
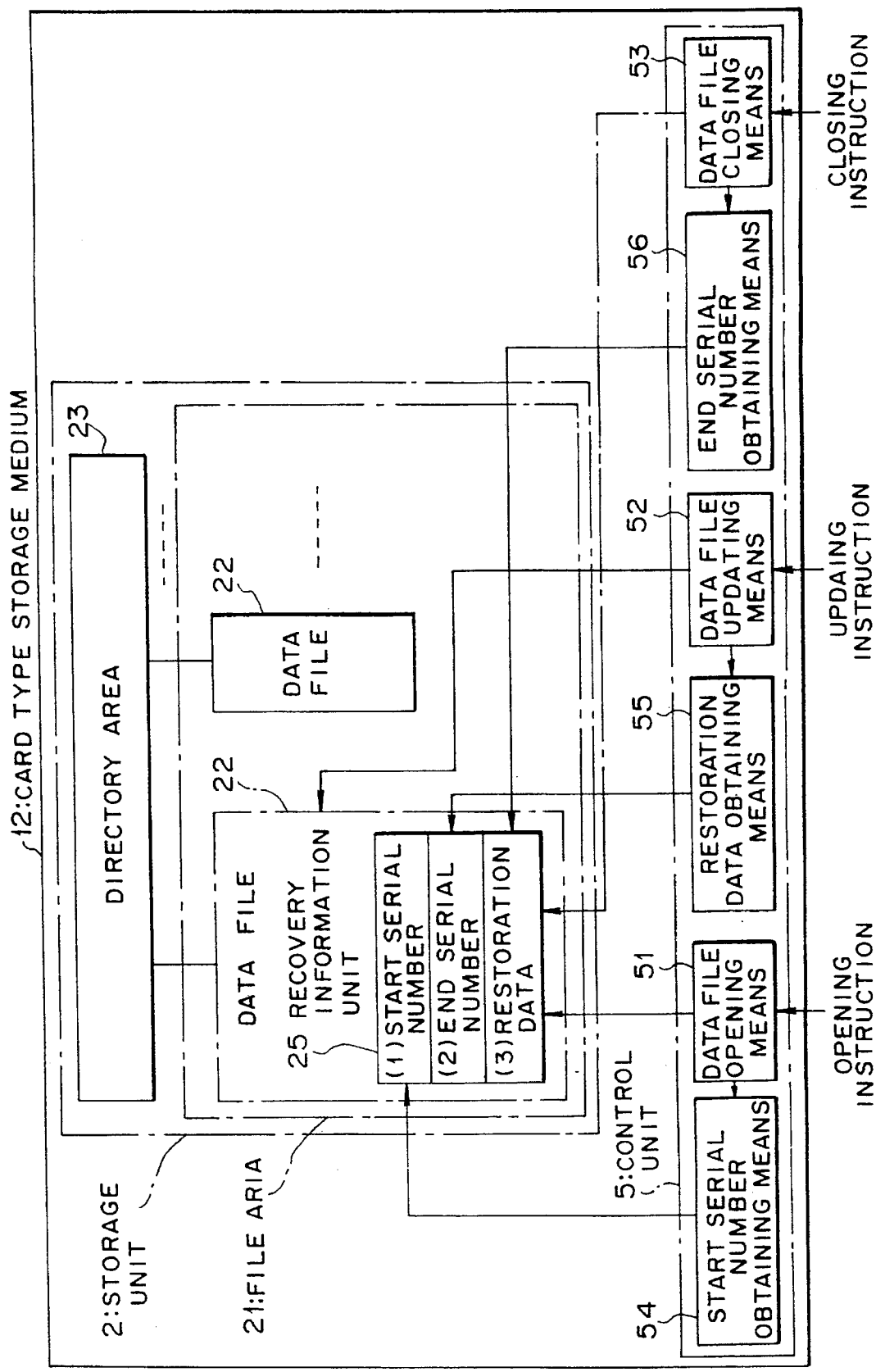
FIG. 4 is a block diagram illustrating still another aspect of this invention.

FIG. 4 is a block diagram showing still another aspect of this invention. In FIG. 4, reference numeral 12 denotes a card type storage medium corresponding to the second invention. The card type storage medium 12, as similar to the card type storage medium 11 shown in FIG. 3, essentially comprises a storage unit 2 and a control unit 5.

The storage unit 2, as similar to the storage unit 2 shown in FIG. 3, has a file area 21 holding data in each file as a unit, and a directory area 23 holding control information including PINs for data files 22 in the file area 21 therein. In the data file 22 in the file area 21 in the storage unit 2 of this invention, there is additionally provided a recovery information unit 25 holding recovery information therein obtained every time the control unit 5 executes an updating operation on the data file 22.

The control unit 5 manages the data files 22 in the files area 21 in the storage unit on the basis of the control information in the directory area 23 in the storage unit 2, similarly to the one shown in FIG. 3. The control unit 5 of this invention includes a data file opening means 51, a data file updating means 52, a data file closing means 53, a start serial number obtaining means 54, a restoration data obtaining means 55 and an end serial number obtaining means 56.

When receiving an opening command from the outside, the data file opening means 51 opens a data file in the file area 21 in the storage unit 2 on the basis of the control information stored in the directory area 23 in the storage unit 2, in response to the opening command.

When receiving an updating command from the outside after the data file 22 has been opened, the data file updating means 52 updates data in the data file 22 that has been opened by the data file opening means 51.

When receiving a closing command from the outside after the data file 22 has been opened, the data file closing means 53 closes the data file 22 that has been opened by the data file opening means 51.

The start serial number obtaining means 54 obtains a start serial number when the data file 22 is opened by the data file opening means 51, and writes it as recovery information into the recovery information unit 25.

When the data file 22 is updated by the data file updating means 52, the restoration data obtaining means 55 obtains restoration data that is data before execution of the updating operation by the data file updating means 52, and writes it as recovery information into the recovery information unit 25.

The end serial number obtaining means 56 obtains an end serial number when the data file closing means 53 closes the data file 22, and writes it as recovery information into the recovery information unit 25.

Incidentally, it is possible to attached check serial numbers as recovery information before and after a start serial number, recovery data and end serial number, respectively, when the start serial number obtaining means 54, the recovery data,obtaining means and the end serial number obtaining means 56 obtain the start serial number, tile restoration data and the end serial number, respectively, then write them together into the recovery information unit 25.

It is also possible to provide in the control unit 5 a restoration data initializing means initializing the restoration data obtained in the last process stored in the recovery information unit 25 before writing the new restoration data obtained this time by the recovery data obtaining means 55 into the recovery information unit 25.

When the data file updating means 52 carries out updating process a plurality of times on the same record number between an open and close of the objective data file 22, the recovered data obtaining means 55 does not write the restoration data into the recovery information unit 25 after the second updating and later.

It is also possible to set information about the presence of the recovery information unit 25 in data file 22 and information about a relative position of the recovery information unit 25 in the data file 22, if the recovery information unit 25 exists, in the control information unit for the data file 22 in the directory area 23 in the storage unit 2.

It is also possible to provide a failure detecting means in the control unit 5, which detects a failure in the last process, on the basis of a start serial number, an end serial number and check serial numbers attached before and after the start serial number and the end serial number, respectively, as recovery information stored in the recovery information unit 25, by referring to the control information about an objective data file in the directory area 23 in the storage unit 2 if the data file 22 has the recovery information unit 25, in response to an opening command from the outside.

If the check serial numbers attached before and after the start serial number are in disagreement, the failure detecting means judges that a failure occurred when the data file was opened by the data file opening means 51 in the last process. When detecting a failure that occured when the data file was opened in the last process, the failure detecting means outputs a demand to perform once more the last process and a demand to restore the start serial number.

It is possible to provide a start serial number restoring means in the control unit 5, which restores the start serial number stored in the recovery information unit 25 to the one at the time of two updating processes earlier in response to the demand to restore the start serial number from the failure detecting means.

In the case where the check serial numbers attached before and after the start serial number are in agreement but the check serial numbers attached before and after the end serial numbers are in disagreement, the failure detecting means judges that a failure occurred when the data file was closed by the data file updating means 52 in the last process. When detecting that a failure occured when the data file was closed in the last process, the failure detecting means outputs a demand to restore the end serial number.

It is possible to provide an end serial number restoring means in the control unit 5, which restores the end serial number stored in the recovery information unit 25 to the one at the time of the last process in response to a demand to restore the end serial number from the failure detecting means.

In the case where the check serial number attached before and after the start serial number and the check serial numbers attached before and after the end serial numbers are individually in agreement but the start serial number and the end serial number are in disagreement, the failure detecting means judges that a failure occurred in the course of updating the data file by the data file updating means 52 in the last process. When detecting that a failure occured in the course of updating the data file in the last process, the failure detecting means outputs a demand to once more perform the last process and a demand to restore the data in the data file 22.

It is possible to provide a data restoring means in the control unit 5, which restores the data in the data file 22 on the basis of the restoration data stored in the recovery information unit 25 in response to a demand to restore the data in the data file 22 from the failure detecting means.

The data restoring means comprises a restoration data effectiveness detecting means which makes a judgement that the restoration data is effective when the check serial numbers attached before and after the restoration data are in agreement, and a restoration data writing means which, when the recovered data effectiveness detecting means judges that the restoration data is effective, writes said restoration data before the updating as data at the record number of said restoration data in the data file 22 into the data file 22.

In the card type storage medium 12 shown in FIG. 4, recovery information obtained every time the data file 22 is updated according to an instruction form the control unit 5 is written in the recovery information unit 25, which is provided in the data file 22 in the file area 21 in the storage unit 2.

More specifically, a start serial number obtained by the start serial number obtaining means 54 when the data file opening means 51 opens the data file 22, restoration data consisting of a record number to be updated and unupdated data at the same record number obtained by the restoration data obtaining means 55 when the data file updating means 52 updates the data file 22, and an end serial number obtained by the end serial number obtained means 56 when the data file closing means 53 closes the data file 22 are written in the recovery information unit 25.

The start serial number and the end serial number in the recovery information unit 25 are compared with each other. If the two numbers are in disagreement, it means that a system failure occurred between an open and close of the data file 22. It is thus possible to detect a system failure without using a BCC.

When the start serial number obtaining means 54, the restoration data obtaining means 55 and the end serial number obtaining means 56 obtain a start serial number, restration data and an end serial number, respectively, check serial numbers are attached before and after the start serial number, the restoration data and the end serial number, respectively, then written into the recovery information unit 25 as recovery information. If the check serial numbers of the start serial number, the recovered data and the end serial number are in disagreement when compared with each other, it means that a system failure occurred while the start serial number, the recovered data or the end serial number are written into the recovery information unit 25 so that it becomes possible to detect a system failure and to verify the effectiveness of data stored in the recover information unit 25.

Before the restoration data obtained by the restoration data obtaining means 56 is written into the recovery information unit 25, the restoration data obtained in the last process stored in the recovery information unit 25 is initialized by the recovery data initializing means, thereby preventing the previously stored restoration data from remaining in the recovery information unit by overwriting the new restoration data obtained in this process when the recovered data is written into the recovery information unit 25, further preventing an erroneous detection of a system failure or the like.

In the case where the updating process is carried out a plurality of times by the data file updating means 52 on the same record number between an open and close of the data file 22, the recovered data obtaining means 55 does not write the recovered data into the recovery information unit 25 after the second updating process and later. Whereby, the previous data obtained before the open of the data file 22 (data before the updating process) of the same record number may be always held as restoration data in the recovery information unit 25.

It is possible to restore the state of the card type storage medium 12 after a system failure has occured to the state before an updating process in which the system failure occurred, on the basis of the data in the recovery information unit 25.

By setting information about the presence of the recovery information unit 25 and information about a relative position of the recovery information unit 25 in a data file 22, if the recovery information unit 25 exists, in the directory area 23 in the storage unit 2, it is possible to make a judgement as to whether predetermined data should be written into the recovery information unit 25 or data recovery on the basis of the data in the recovery information unit 25 should be performed, only by referring to the directory area 23 in the storage unit from the control unit 5.

In response to an opening command from the outside, the control information stored in the directory area 23 in the storage unit 2 with respect to the objective data file 22 is referred to. If the objective data file 22 has a recovery information unit 25, the failure detecting means provided in the control unit 5 checks as to whether a failure occurred in the last process or not, on the basis of a start serial number, an end serial number and check serial numbers attached before and after the start serial number and the end serial number, thereby detecting conflicting data having developed due to a system failure without using a BCC.

If the check serial numbers attached before and after the start serial number are in disagreement, the failure detecting means detects an occurrence of a failure when the data file was opened by the data file opening means 51 in the last process. When detecting a 25 failure, the failure detecting means outputs a demand to execute once more the last process and a demand to restore the start serial number, thereby appropriately performing again the last process that was erroneously terminated due to the system failure.

The start serial number recoverying means restores the start serial number stored in the recovery information unit 25 to the one at the time of the last process so that the state of the recovery information unit 25 can be automatically restored to the state at the time of two updating process earlier within the card type storage medium 12.

In the case where the check serial numbers attached before and after the start serial number are in agreement but the check serial numbers attached before and after the end serial number are in disagreement, the failure detecting means judges that a failure occurred when the data file closing means closed the data file in the last process. If detecting a failure, the failure detecting means outputs a demand to restore the end serial numbers to cause the end serial number restoring means to restore the end serial number stored in the recovery information unit 25 to the one at the time of the last process, thereby automatically restore the state of the recovery information unit 25 to the state at the time of the last process within the card type storage medium 12.

In the case where the check serial numbers attached before and after the start serial number and the check serial numbers attached before and after the end serial number are individually in agreement but the start serial number and the end serial number are in disagreement, the failure detecting means judges that a failure occurred during the last updating process carried out by the data file updating means 52. The failure detecting means outputs a demand to perform once more the last process and a demand to restore the data in the data file 22, thereby once again carrying out the last process that resulted in unsuccess due to the system failure.

The data restoring means restores the data in the data file 22 on the basis of the recovered data stored in the recovery information unit 25. This enables the data file 22 to be automatically restored to the state at the time of the two updating processes earlier (a state before the failure occured), thereby once more executing the last process appropriately on the data file 22 in the state two updating processes earlier.

When the data restoring means restores the data, the restoration data writing means writes only effective restoration data whose check serial numbers attached before and after the restoration data are judged by the restoration data effectiveness detecting means, thereby enabling data recovery without using restoration data in which a system failure occured during writing it (that is, data whose check serial numbers attached before and after the data are in disagreement).

According to this invention, the start serial number and the end serial number in the recovery information unit 25 are compared with each other in the card type storage medium 11 or 12. If the start serial number and the end serial number are not in disagreement, it is thus possible to detect a system failure that occurred between an open and close of the data file 22. The check serial numbers attached before and after each data are also compared with each other. If the check serial numbers are in disagreement, it is thus possible to detect a system failure that occurred while a start serial number, recovered data or an end serial number are written into the recovery information unit 25, whereby the effectiveness of each data written in the recovery information unit 25 can be verified, further conflicting data developed due to the system failure can be surely detected.

Before the recovered data obtained by the recovery data obtaining means 55 is written in the recovery information unit 25, recovered data that was written in the recovery information unit 25 in the last process is initialized by the restoration data initializing means, thereby preventing the previous restoration data from remaining in the recovery information unit 25 by overwriting when the new restoration data is written in the recovery information unit 25, further preventing the system failure from being erroneously detected.

In the case where updating process is executed a plurality of times on the same record number by the data file updating means 52 between an open and close of the data file 22, the restoration data is not written in the recovery information unit 25 after the second updating and later. The recovery information unit 25 therefore can always hold data before the data file is opened (that is, data before the updating) at the same record number. It is thus possible, even after a system failure has occcured, to effectively restore the state in the card type storage medium 1 or 12 to a state before the updating process in which a system failure occurred, on the basis of the data in the recovery information unit 25.

Information about the presence of the recovery information unit 25 and information about a relative position of the recovery information unit 25 in the data file 22, if the recovery information unit 25 exists, are set in the directory area 23 in the storage unit 2, whereby a judgement can be made on as to whether predetermined data should be written into the recovery information unit 25, or data recovery should be performed on the basis of the data in the recovery information unit 25, only by referring to the directory area 23 in the storage unit 2 from the control unit 5.

The failure detecting means can detect a failure having occurred in the last process on the basis of a start serial number, an end serial number and check serial numbers attached before and after the start serial number and the end serial number, respectively, held in the recovery information unit 25 in response to an opening command from the outside, if the data file 22 has the recovery information unit 25, thereby automatically detecting conflicting data developed due to a system failure without using a BCC within the card type storage medium 11 or 12.

According to a result of detection carried out by the failure detecting means, the start serial number restoring means, the end serial number restoring means, the data restoring means can automatically repair and restore the recovery information unit 25 or the application area, thereby simplifying the configuration of the system, reducing inconvenience to the users upon restoring the data, in addition.

When the data restoring means restores the data, the restoration data writing means writes only effective restoration data, whose check serial numbers attached before and after the restoration data are judged to be in agreement by the restoration data effective detecting means, into the data file. This makes it possible to store only certain and effective data, avoiding use of restoration data in which a system failure occurred while the restoration data was being written.

(b) Description of First Embodiment

Description will be hereinafter made in detail of a first embodiment of this invention. Now, referring to FIG. 7, there is shown an IC (integrated circuit) card 6 as a card type storage medium, having an IC unit 60 therein. The IC card 6 is issued by a card issuing apparatus (a card type storage medium issuing apparatus) 7 having a hardware configuration as shown in FIG. 7.

Figure 7:
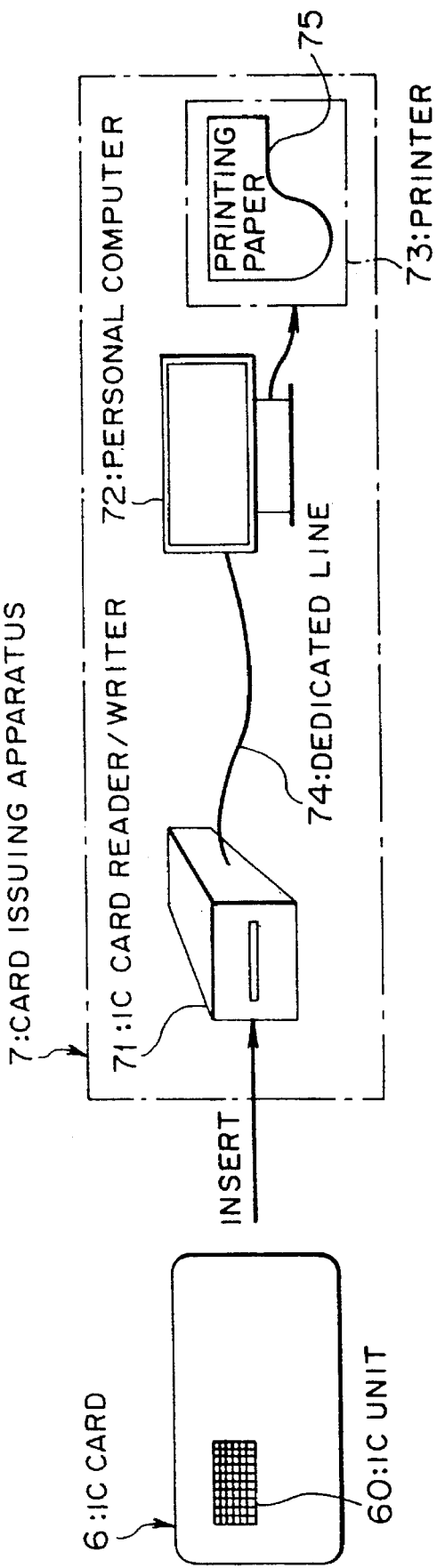
FIG. 7 is an illustration of a typical hardware configuration of the card type storage medium issuing apparatus according to the first embodiment.

The IC card issuing apparatus 7 comprises, as shown in FIG. 7, an IC card reader/writer 71, a personal computer 72 and a printer 73.

The IC card reader/writer 71 is connected to the personal computer 72 via a dedicated line (for example, RS232C cable), into which the IC card 6 is inserted to be read out or written into.

The personal computer 72 causes the IC card reader/writer 71 to write data into the IC card 6 so that the IC card may have a predetermined data content 20 therein, functioning as a main frame of the card issuing apparatus.

The printer 73 is served to printout a PIN and the like that is a result of verification made on personal identification numbers (PINs) onto a predetermined printing paper 75 in response to an instruction from the personal computer 72.

An internal configuration of the IC card 6 as a card type storage medium according to the first embodiment of this invention will be hereinafter described referring to FIGS. 5 and 6.

Figure 5:
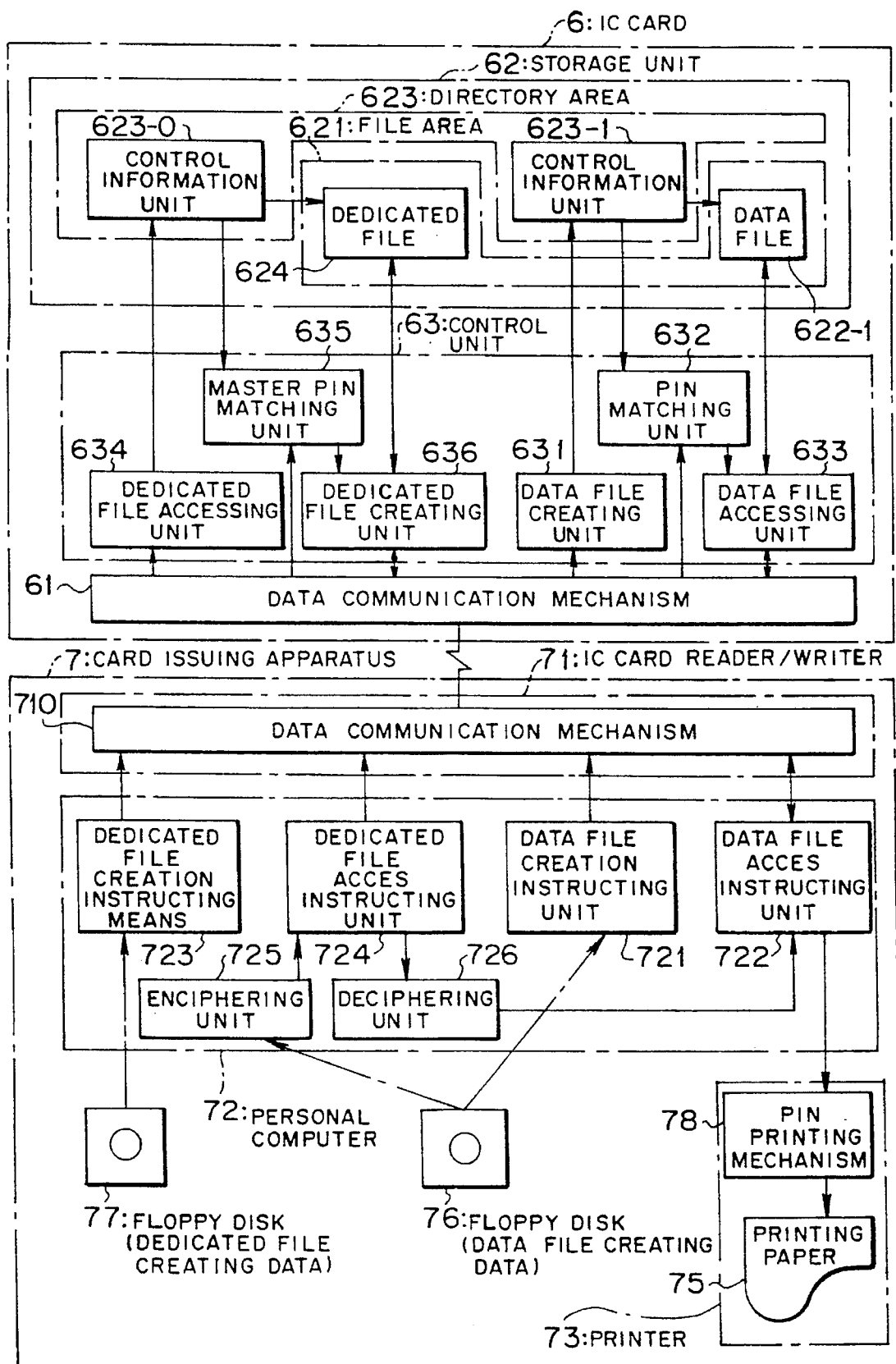
FIG. 5 is a block diagram showing a card type storage medium and an issuing apparatus issuing the card type storage medium according to the first embodiment of this invention.

As shown in FIG. 5, the IC card 6 according to the first embodiment comprises a data communication mechanism 61, a storage unit 62 and a control unit 63.

The data communication mechanism 61 of the IC card 6 sends and receives information to and from the card issuing apparatus 7 when the IC card 6 is inserted into the IC card reader/writer 72 (or another terminal apparatus, a host computer, etc.) of the card issuing apparatus 7, including a terminal (a contact) which contacts with a terminal (of a data communication mechanism 710) of the IC card reader/writer 71 to transmit and receive signals thereto and therefrom.

The storage unit 62, employing a tree structure, includes a file area 621 including data to be processed by various application programs (i.e., programs to be incorporated in a terminal apparatus, a host computer, etc.) by files therein, and a directory area 623 holding control information about each file in the file area 621 therein.

Figure 6:
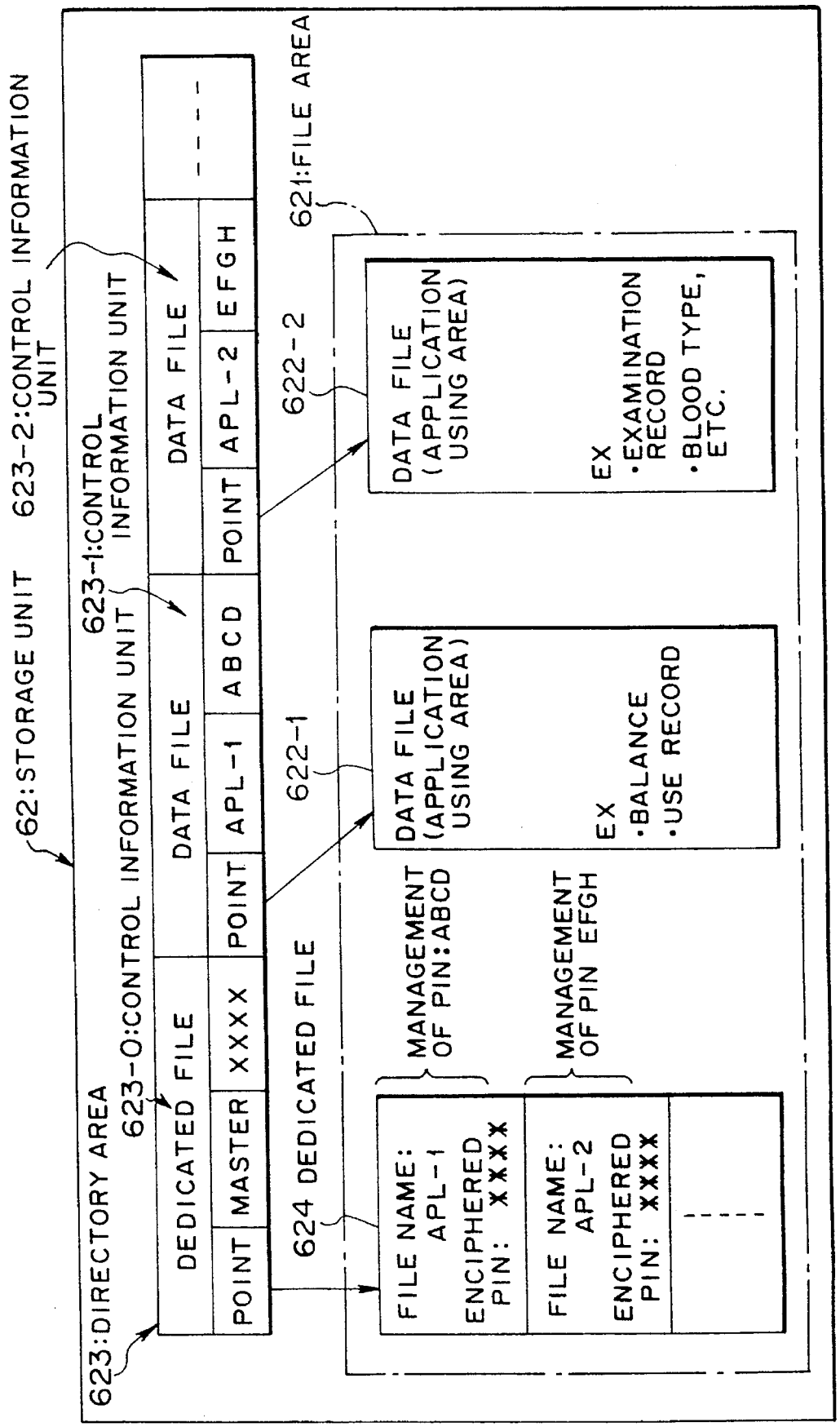
FIG. 6 is a block diagram showing a file structure in a storage unit of the card type storage medium according to the first embodiment.

For instance, data files (in an application using area) 622-1, 622-2, . . . , to be handled by various application programs are held in the file area 621 in the storage unit 62, as shown in FIG. 6.

In this embodiment, the data file 622-1 is to be processed by an application program for cashless service, dedicated to hold data about, for example, the balance, use record, etc. therein. The data file 622-2 is to be processed by an application program for medical examination service in hospital or the like, dedicated to hold, for example, examination record, blood type, etc. therein.

The directory area 623 contains control information units 623-1, 623-2, . . . about the respective data files 622-1, 622-2, . . . therein.

In each of the control information units 623-1, 623-2, . . . , a file name (APL-1 or APL-2), a position (a point or an address) in the file area 621, and a PIN (PIN; ABCD, or EFGH) of each of the data files 622-1, 622-2, . . . are written.

The IC card 60 also has a dedicated file (different from the data files 622-1, 622-2, . . . , for the application programs) in the file area 621 in the storage unit 62, used to manage PINs of the data files 622-1, 622-2, . . . , retained therein, as shown in FIG. 6.

The dedicated file 624 holds data of file names (APL-1, APL-2, . . . ) of the data files (622-1, 622-2, . . . ) and their PINs (ABCD, EFGH, . . . ) in an enciphered form (PIN:****, ####, . . . ) in such manner that the each enciphered PIN of a data file corresponds to its file name .

The directory area 623 in the storage unit 62 has a control information unit 623-0 for the dedicated file 24, in which a position (a point or an address) in the file area 621, a file name (Master), and a master personal identification number (a PIN known by only the system manager, hereinafter referred, occasionally, as a master PIN) of the dedicated file 624 are held.

As shown in FIG. 5, the control unit (MPU: micro processor unit) 63 of the IC card 6 is to manage data retained in the file area 621 in the storage unit 62 according to the control information held in the directory area 623 in the storage unit 62. The control unit 63 according to this embodiment, comprises a data file creating unit 631, a PIN matching unit 632, a data file accessing unit 633, a dedicated file creating unit 634, a master PIN matching unit 635 and a dedicated file accessing unit 636.

The data file creating unit 631 sets the control information units 623-1, . . . including pins, points and files names of the respective data files 622-1, . . . in the directory area 623 in the storage unit 62 in response to a data file creating command from the card issuing apparatus 7 to create the data files 622-1, . . . in the file area 621 in the storage unit 62.

In response to a data file access command from outside (i.e., the card issuing apparatus 7, the terminal apparatus, the host computer, etc.) to access a data file 622-1 created by the data file creating unit 631, the PIN matching unit 632 makes a judgement as to whether a PIN of the data file 622-1, . . . that is an object of the access command (i.e., a PIN held in the control information unit 623-1 in the directory area 623) is in agreement with a PIN fed from the outside included in the above data file access command.

The PIN matching unit 632 according to this embodiment also has a file locking function to lock a data file 622-1, . . . that is an object of an access when the matching of the PINs is successively resulted in failure predetermined times, and a function to release the file locking state in response to an instruction from the outside, in addition to the above matching function.

The data file access unit 633 executes an access process (write/read) on the data file 622-1 that is an object of the access when the PIN matching unit 632 judges that the PINs are in agreement.

The dedicated file creating unit 634 sets a control information unit 623-0 including a master PIN, a point and a file name of a dedicated file 624 in the directory area 623 in the storage unit 62 in response to a dedicated file creating command from the card issuing apparatus 7 to create the dedicated file 624 in the file area 621 in the storage unit 62.

In response to a dedicated file access command from the card issuing apparatus 7 to gain an access to the dedicated file 624 created by the dedicated file creating unit 634, the mater PIN matching unit 635 makes a judgement as to whether a master PIN held in the control information unit 623-0 in the directory area 623 is in agreement with a master PIN included in the above dedicated file access command from the card issuing apparatus 7.

When the master PIN matching unit 635 judges that the two PINs are in agreement, the dedicated file access unit 636 executes an access process (write/read) on the dedicated file 624.

At the time of issuing the IC card 6, the dedicated file creating unit 634, to begin with, creates the dedicated file 624, the dedicated file access unit 636 next writes PINs (enciphered PINs in this embodiment) and file names of the respective data files 622-1, . . . into the dedicated file 624 such that each PIN of the data file corresponds to its file name, in response to a dedicated file access command supplied from the card issuing apparatus 7.

The IC card may have an electric source therein, or may be supplied electric energy from the card issuing apparatus 7, the terminal apparatus or the host computer when the IC card is inserted into them. In the latter case, a non-volatile storage such as an EEPROM is employed to the storage unit 62 of the IC card 6.

A configuration of the card issuing apparatus 7 which issues a card type storage medium according to the first embodiment will be next described in detail, referring to FIG. 5.

As stated above in connection with FIG. 7, the card issuing apparatus 7 according to the first embodiment comprises the IC card reader/writer 71, the personal computer 72 and the printer 73.

The IC card reader/writer 71 has the data communication mechanism 710 which is adapted to communicate between the IC card 6 and the personal computer 72 to write or read information to and from the IC card 6 when the IC card 6 is inserted thereinto. The data communication mechanism 710 includes a terminal (a contact) contacting with a terminal (of a data communication mechanism 61) of the IC card 6 to send or receive signals.

The personal computer 72 functions as a card issuing apparatus to issue the above IC card 6 as mentioned above, comprising a data file creation instructing unit 721, a data file access instructing unit 722, a dedicated file creation instructing unit 723, a dedicated file access instructing unit 724, an eneiphering unit 725 and a decoding unit 726.

The data file creation instructing unit 721 sets control information units 623-1 including PINs, points, file names of respective data files 622-1, . . . in the directory area 623 in the storage unit 62. In order to create the data files 622-1, . . . in the file area 621 in the storage unit 62, the data file creation instructing unit 721 generates a data file creating command including control information such as the PINs of the data files on the basis of data file creating data (including the PINs) stored in the floppy disk 76, and transfers the generated data file creating command to the data file creating unit 631 of the IC card 6 via the data communication mechanisms 710 and 61.

The data file access instructing unit 722 generates a data file access command including a PIN for a data file 622-1 to be accessed in order to execute an access process on the created data file 622-1 in the file area 621 in the storage unit 62 of the IC card 6, then transfers the generated data file access command to the IC card 6 (the PIN matching unit 632 and the data file access unit 832). The data file access instructing unit 722 also has a function to transfer an instruction to verify the correctness of the data file corresponding to the PIN when the PIN in the IC card 6 is checked, as described later.

The dedicated file creation instructing unit 723 sets a control information unit 623-0 including a master PIN, a point, a file name of the dedicated file 624 in the directory area 623 in the storage unit 62 of the IC card 6. In order to create the dedicated file 624 in the file area 621 in the storage unit 62 of the IC card 6, the dedicated file creation instructing unit 623 generates a dedicated file creating command including the master PIN on the basis of dedicated file creating data stored in the floppy disk 77, then transfers the generated dedicated file creating command to the dedicated file creating unit 634 of the IC card 6 via the data communication mechanisms 710 and 61.

In order to execute an access process on the dedicated file 624 created in the file area 621 in the storage unit 62 of the IC card 6, the dedicated file access instructing unit 724 generates a dedicated file access command including the master pin of the dedicated file 624, then transfers the generated dedicated file access command to both the master PIN matching unit 635 and the dedicated file access unit 636 of the IC card 6 via the data communication mechanisms 710 and 61. The dedicated file access instructing unit 624 also has a function to transfer an instruction to verify the PINs of the IC card 6, as described later.

The dedicated file access instructing unit 724 according to this embodiment also has a function to generate a dedicated file access command including data, a pair of the enciphered PIN and the file name of each data file 622-1, . . . , on the basis of the data file creating data stored in the floppy disk 76, then transfers the generated dedicated file access command to the dedicated file access unit 636 of the IC card 6 via the data communication mechanisms 710 and 61 upon issuing the IC card 6, after the dedicated file creation instructing unit 723 transferred the dedicated file creating command to the IC card 6.

The personal computer 72 of the card issuing apparatus 7 according to this embodiment is provided the enciphering unit 725 which enciphers the PINs of the data files 622-1, . . . supplied from the floppy disk 76 in order to write the enciphered PINs of the data files 622-1 into the dedicated file 624, and the decoding unit 726 which deciphers the enciphered PINs read out from the dedicated file 624 when PIN verification is carried out, as described later.

Upon checking a PIN of the IC card 6, the dedicated file access instructing unit 724 according to this embodiment functions to generate a dedicated file access command including the master PIN in order to read out data from the dedicated file 624 of the IC card 6 which holds therein the PIN to be verified, then transfer the generated dedicated file access command to both the master PIN matching unit 635 and the dedicated file access unit 636 via the data communication mechanisms 710 and 61.

When the data (that is, data of a pair of the enciphered PIN and the file name of the data file 622-1) is read out from the dedicated file 624 of the IC card 6 in response to the dedicated file access command from the dedicated file access instructing unit 724 upon verification of the PIN of the IC card 6, the data file access instructing unit 722 according to this embodiment generates a data file access command including the PIN read out (that is, the PIN deciphered by the decoding unit 726), then transfers the generated data file access command to both the PIN matching unit 632 and the data file access unit 633 via the data communication mechanisms 710 and 61 so as to give an instruction to the IC card 6 to verify the correctness of the data file 622-1 corresponding to the PIN read out.

The printer 73 has a PIN printing mechanism 78. When the data file access instructing unit 724 verifies the correctness of the PIN read out by the dedicated file access instructing unit 724 upon PIN verification, the PIN printing mechanism of the printer 73 printouts the PIN that is a result of the verification on a predetermined printing paper 75 in response to an instruct/on from the personal computer 7.

To issue the IC card 6 according to this embodiment, the following process is performed, with the IC card 6 being inserted in the IC card reader/writer of the card issuing apparatus 7.

The dedicated file creating instructing unit 723 converts the dedicated file creating data (including the master PIN) stored in the floppy disk 77 into data in a format for a program incorporated in the IC card 6 to generate a dedicated file creating command including the master PIN, then transfers the generated dedicated file creating command to the dedicated file creating unit 634 of the IC card 6 via the data communication mechanisms 710 and 61.

In the IC card 6, when receiving the dedicated file creating command, the dedicated file creating unit 634 sets a control information unit 623-0 including a master PIN, a point and a file name of the dedicated file 624 in the directory area 623 in the storage unit 62 in response to the dedicated file creating command so as to create the dedicated file 624 in the file area 621 in the storage unit 62.

The data file creation instructing unit 721 in the card issuing apparatus 7 converts the data file creating data (including PINs for a card owner) stored the floppy disk 67 into data in a format for a program incorporated in the IC card 6 to generate a data file creating command including the PINs, then transfers the generated data file creating command to the data file creating unit 631 of the IC card 6 via the data communication mechanisms 710 and 61.

In the IC card 6, when receiving the data file creating command, the data file creating unit 631 sets a control information units 623-1 each including a PIN, a point and a file name of the data file 622-1 in the directory area 623 in the storage unit 62 in response to the data file creating command to create the data files 622-1 in the file area 821 in the storage unit 62.

Next, PINs are extracted from the data file creating data stored in the floppy disk in the card issuing apparatus 7, then enciphered to be an enciphered PINs. The dedicated file access instructing unit 724 then converts the data of a pair of the enciphered PIN and the file name of each data file 622-1 into data in a format for a program incorporated in the IC card 6 to generate a dedicated file access command including the above data, then transfers the generated dedicated file access command to the dedicated file access unit 636 of the IC card 6 via the data communication mechanisms 710 and 61.

When receiving the dedicated access command, the dedicated file access unit 636 of the IC card 6 writes the enciphered PINs of the respective data files 622-1 in the dedicated file 624 such that the enciphered PIN of the data file 622-1 corresponds to its file name in response to the dedicated file access command, as shown in FIG. 6.

Through the above process, the IC card 6 is issued, going into a state to be able to receive general application services. At that time, the PINs for each card owner are managed in the dedicated file 624 in the IC card 6 that is possessed by the card owner.

To receive a general application service through the IC card, the owner inserts the IC card 6 into the terminal apparatus or the host computer providing the predetermined application. The terminal apparatus or host computer gives a data file access command to the IC card 6 to cause the IC card 6 to perform an access process (write/read) on each data file 622-1, . . . in the storage unit 62.

More specifically, when receiving the data file access command from the terminal apparatus, host computer or the like, the PIN matching unit 632 makes a judgement as to whether a PIN of the data file 622-1 to be accessed (held in the control information unit 623-1 in the directory area 623) is in agreement with a PIN included in the data file access command supplied from the outside (i.e., a PIN inputted by the card owner through the terminal apparatus, host computer or the like).

When the PIN matching unit 632 makes a judgement that the above two PINs are in agreement, the data file access unit 633 performs an access process (write/read) on the objective data file 622-1. When the PIN matching unit 632 successively draws the same conclusion predetermined times that the above two PINs are in disagreement, the PIN matching unit 632 locks the objective data file 622-1 so that the data file 622-1 is prohibited from being used.

Meanwhile, if the card owner forgets the PIN of his or her own IC card 6 after the issue of the IC card 6, it is possible to verify the PIN by carrying out the following process with the IC card 6 being inserted in card reader/writer 71 of the card issuing apparatus 6, according to this embodiment.

Namely, in order to read out data in the dedicated file 624 in the IC card 6, the dedicated file access instructing unit 724 generates a dedicated file access command including the master PIN, then transfers the generated dedicated file accessing command to both the master PIN matching unit 635 and the dedicated file access unit 636 of the IC card 6 via the data communication mechanisms 710 and 61.

On the side of the IC card 6, the master PIN matching unit 635 compares the master PIN (held in the control information unit 623-0 in the directory area 623) of the dedicated file 624 with the master PIN included in the dedicated file access command when receiving the dedicated file access command.

If the mater PIN matching unit 635 makes a judgement that the two master PINs are in agreement, the dedicated file accessing unit 636 reads out the data of a pair of the enciphered PIN and the file name of a data file from the dedicated file 624, then transfers it to the dedicated file access instructing unit 724 of the card issuing apparatus 7 via the data communication mechanisms 61 and 710.

The dedicated file access instructing unit 724 next makes the decoding unit 726 decipher the enciphered PIN, then reports data of a pair of the deciphered PIN and the file name of the data file to the data file access instructing unit 722.

When receiving the report form the dedicated file access instructing unit 724, the data file accessing instructing unit 722 generates a data file access command including the deciphered PIN, then transfers the generated data file accessing command to both the PIN matching unit 632 and the data file access unit 633 of the IC card 6 via the data communicating mechanisms verification on the correctness of the data file 622-1 corresponding to the PIN read out.

On the side of the IC card 6, the PIN matching unit 632 checks as to whether the PIN (held in the control information unit 623-1 in the directory area 623) of the data file 622-1 to be verified is in agreement with the PIN included in the data file accessing command supplied from the card issuing apparatus 7, in response to the data file accessing command to verify the correctness of the PIN.

If the PIN matching unit 632 draws a conclusion that the two PINs are in agreement, it is judged that the correctness of the data file 622-1 corresponding to the PIN read out has been verified. At that time, if the data file 622-1 that is an object of the correctness verification is in a locked state, the PIN matching unit the IC card 6 into a normal state.

When the correctness of the IC card 6 is verified in the above manner, the PIN printing mechanism 78 of the printer 73 printouts the deciphered PIN read out by the dedicated file access instructing unit 724 on the predetermined printing paper 75, then the verification of the PIN finishes.

According to the first embodiment, the data consisting of a pair of the PIN and file name of each data file 622-1, . . . is set in the file area 621 in the storage unit 62 of the IC card 6. The PINs in each IC card 6 are managed by and within the IC card itself, in no need of management of the PINs by the host computer, thereby largely reducing a burden for PIN management oh the entire IC card system.

The data in the dedicated file 624 cannot be read out without the master PIN known, by only the system manager. Even if the master PIN leaked out except the system manager, the PINs of the data files 622-1, . . . do not leak out as they are, since each of the PIN of the data file 622-1 is enciphered. So long as the manner to encipher the PINs of the data files 622-1 is kept in secret, each PIN cannot be solved.

It is therefore possible to securely prevent the PINs from being out and avoid a problem in security, even if the PINs are managed by and within the IC card 6.

Further, upon verification of the PINs in the case of an accident, the dedicated file access instructing unit 724 of the card issuing apparatus 7 generates a dedicated file accessing command including the master PIN, then transfers the command to the IC card 6. The manner of this verification is quite simple and can reduce inconvenience to the card user.

According to this embodiment, when the PIN is verified, the data file access instructing unit 722 transfers a data file accessing command to the IC card 6 to verify the correctness of the PIN read out from the dedicated file 624, and the PIN matching unit 632 executes a PIN matching to make sure the correctness of the data file 622-1 corresponding to the PIN read out, thereby increasing the reliability in the PIN verification.

In the above embodiment, the data file creating data and the dedicated file creating data are supplied from the floppy disks 76 and 77, respectively. It is also possible to input the data file creating data and the dedicated file creating data through a keyboard or the like.

(c) Description of Second Embodiment

Figure 8:
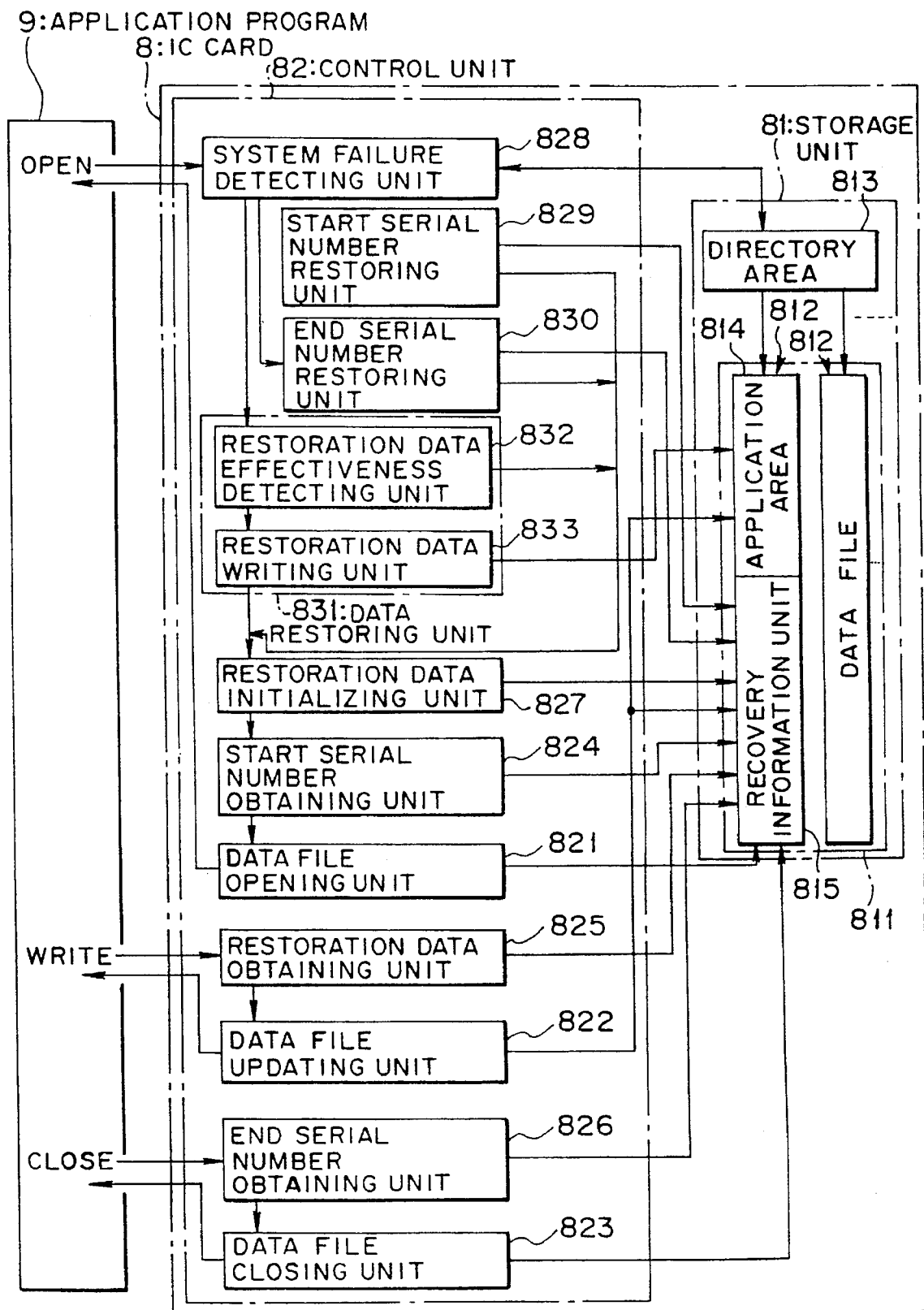
FIG. 8 is a block diagram showing a card type storage medium according to a second embodiment of this invention.

Referring now to FIG. 8, an IC card 8 according to a second embodiment comprises a storage unit 81 and a control unit 82.

The storage unit 81 has a tree structure, including a file area 811 holding data to be processed by various application programs (i.e., programs incorporated in a terminal apparatus, a host computer, etc.) by files therein, and a directory area 813 holding control information about each of data files 812 in the file area 811 therein.

In the directory area 813, a file name, a personal identification number (PIN), a position (i.e., and the like of each data file 812 held in the file area 811 are written.

Figure 9:
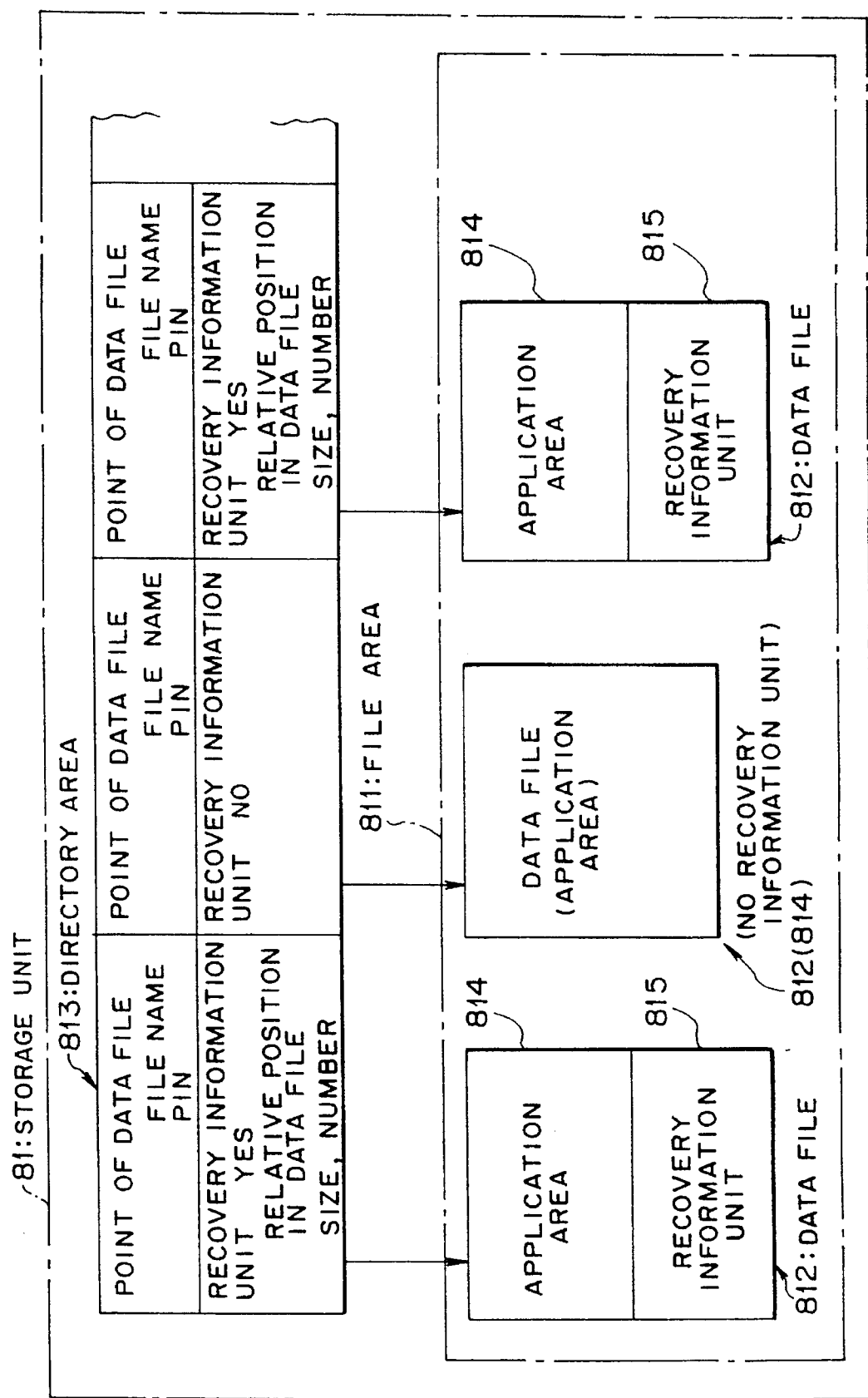
FIG. 9 is a block diagram showing a file structure in a storage unit of the card type storage medium according to tile second embodiment.

The IC card 8 according to this embodiment is additionally provided with a recovery information unit 815 in the data file 812 in the file area 811 in the storage unit 81, into which the control unit 82 writes recovery information obtained every time the data file 812 is updated, as shown in FIG. 9.

Figure 10:
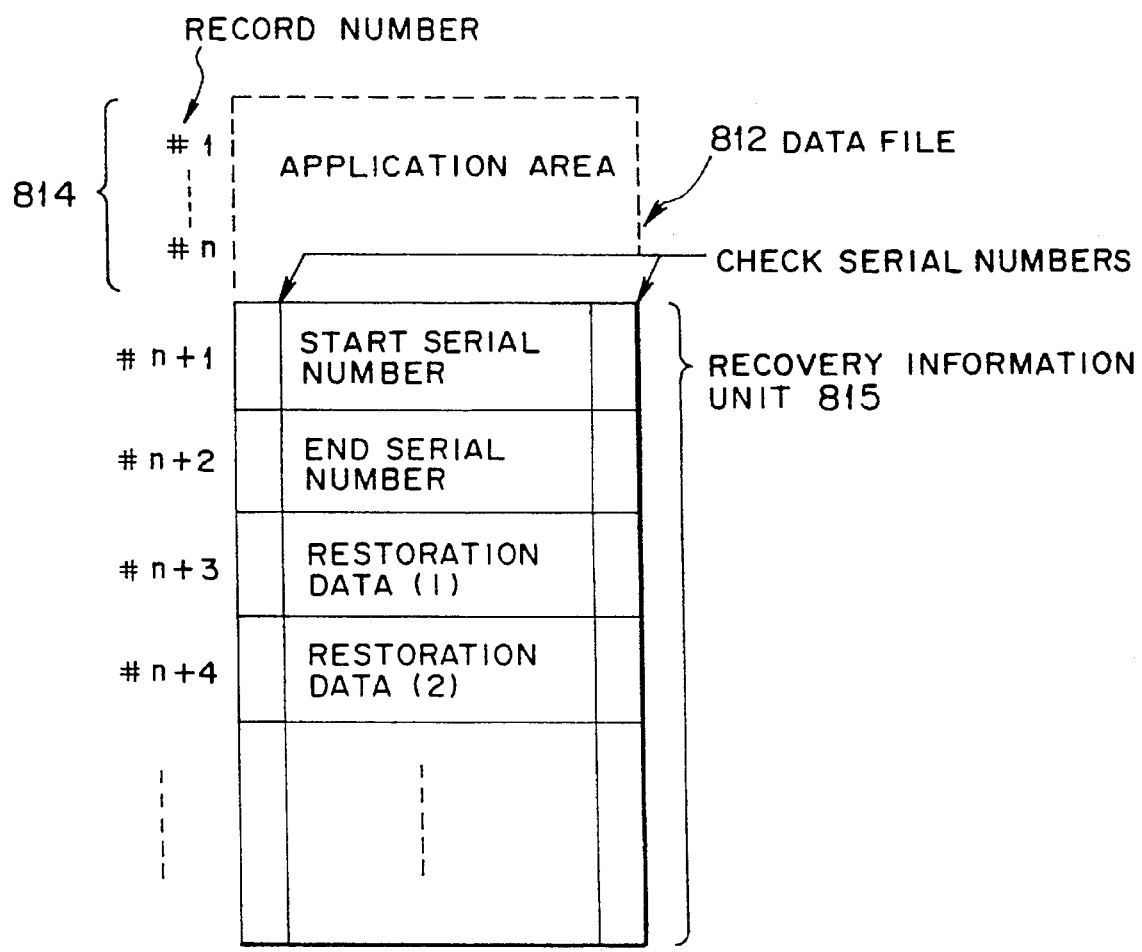
FIG. 10 is an illustration showing a content of data held in a recovery information unit of the card type storage medium according to the second embodiment.

More concretely, as shown in FIG. 10, record numbers #1 to #n are allocated to an application area 814 to store data to be processed by one of various application programs (i.e., data of the balance in the case of a cashless card), and record numbers after #n+1 and later are allocated to the recovery information unit 815.

As shown in FIG. 10, a start serial number (the number of processed items) obtained when the data file 812 is opened is written in the record number #n+1 in the recovery information unit 815, an end serial number (the number of processed items) obtained when the data file 812 is closed is written in the record number #n+2, and restoration data consisting of a record number whose data has been updated (i.e., an updated record number in the application area 814) and unupdated data at the same record number (i.e., data before subjected to the updating in the application area 814) obtained when the data file 812 is updated is written in the record numbers after #n+3 and later. According to this embodiment, check serial numbers (the number of items) are respectively attached, as recovery information, before and after the start serial number, the restoration data and the end serial number held in the recovery information unit 815.

As shown in FIG. 9, there are set, in the directory area 813 in the storage unit 81 as control information of each data file 812, information as to whether the recovery information unit 815 is additionally provided in a data file 812 (that is, information about the presence of the recovery information in a data file 812), information about a relative position of the recovery information unit 815 in the data file 812, if the recovery information 815 exists in the data file 812 (that is, the leading record number of the recovery information unit 815), and a size and a number of the recovery information unit 815.

The control unit 82 according to this invention is adapted to manage the data files 812 in the file area 811 in the storage unit 81 on the basis of the control information held in the directory area 813 in the storage unit 81, comprising a data file opening unit 821, a data file updating unit 822, a data file closing unit 823, a start serial number obtaining unit 824, a restoration data obtaining unit 825, an end serial number obtaining unit 826, a restoration data initializing unit 827, a system failure detecting unit 828, a start serial number restoring unit 829, an end serial number restoring unit 830 and a data restoring unit 831.

When receiving an OPEN command (an open instruction) from an application program 9 incorporated in a terminal apparatus or the like into which the IC card 8 is inserted, the data file opening unit 821 opens a data file 812 designated by the open command, on the basis of the control information in the directory area 813 in the storage unit 81.

When receiving a WRITE command (an updating instruction) from the application program 9 after the data file 812 has been opened, the data updating unit 822 updates data in the data file 812 having been opened by the data file opening unit 821.

When receiving a CLOSE command (a closing instruction) from the application program 9 after the data file 812 has been opened, the data file closing unit 823 closes the data file 812 having been opened by the data file opening unit 821.

The start serial number obtaining unit 824 obtains a start serial number (whose initial value is 0) by adding 1 to the latest start serial number when the data file 812 is opened by the data file opening unit 821. The start serial number obtaining unit 824 also attaches check serial numbers (whose initial value is 1, incremented by 1 every time the data file 812 is opened) before and after the start serial number, and writes both the start serial number and its check serial numbers as recovery information in the record number #n+1 of the recovery information unit 815.

The restoration data obtaining unit 825 acquires restoration data including a record number to be updated and unupdated data at the same record number when the data file 812 is updated by the data file updating unit 822. The restoration data obtaining unit 825 also attaches check serial numbers before and after the restoration data, and writes the restoration data and its check serial numbers as recovery information in the record number on and after #n+3, in order.

If the data file updating unit 822 executes plural times of updating process on the same record number between an open and close of the data file 812, the restoration data obtaining unit 825 does not write data into the recovery information unit 815 after the second updating process and later.

The end serial number obtaining unit 826 obtains an end serial number (whose initial value is 0) by adding 1 to the latest start serial number when data file closing unit 823 closes the data file 812. The end serial number obtaining unit 826 also attaches check serial numbers (whose initial values are 1, incremented by 1 every time the data file 812 is closed) before and after the end serial number, and writes both the end serial number and its check serial numbers as recovery information into the record number #n+2 in the recovery information unit 815.

Before the restoration data having been acquired by the restoration data obtaining unit 825 has been written into the recovery information unit 815, the restoration data initializing unit 827 initializes the restoration data that is being stored in the recovery information unit 815 (more specifically, setting the restoration data all at 0 and the check serial numbers all at 1).

When receiving an OPEN command (an open instruction) from the application program 9, the system failure detecting unit (a failure detecting means) 828, firstly, looks up the control information relating to a data file 812 designated by the OPEN command held in the directory area 813 in the storage unit 81. If the data file 812 has a recovery information unit 815 therein, the system failure detecting unit 828 detects a failure having occurred in the last process on the basis of the start serial number, the end serial number and the check serial numbers attached before and after these start serial number and end serial number, respectively, written as recovery information in the recovery information unit, through following procedure shown in FIG. 12.

When the check serial numbers attached before and after the start serial number are in disagreement, the system failure detecting unit 828 makes a judgement that a failure occurred when the data file opening unit 821 opened the data file in the last process, outputting a demand to reprocess the last process to the application program 9 and a demand to restore the start serial number to the start serial number restoring unit 829.

When receiving a demand to restore the start serial number form the system failure detecting unit 828, the start serial number restoring unit 829 restores the start serial number stored in the recovery information unit 815 to the one at the time of two updating processes earlier.

When the check serial numbers attached before and after the start serial number are in agreement but the check serial numbers attached before and after the end serial number are in disagreement, the system failure detecting unit 828 makes a judgement that a failure occurred when the data file closing unit 823 closed the data file in the last process, and outputs a demand to restore the end serial number to the end serial number restoring unit 830.

When receiving the demand to restore the end serial number from the system failure detecting unit 828, the end serial number restoring unit 830 restores the end serial number being stored in the recovery information unit 815 to the one at the time of the last process.

When the check serial numbers attached before and after the start serial number and the check serial numbers attached before and after the end serial number are in agreement but the start serial number and the end serial number are in disagreement, the system failure detecting unit 828 judges that a failure occurred when the data file updating unit 822 updated the data file in the last process, and outputs a demand to perform once again the last process to the application program 9 and a demand to restore the data in the data file 812 to the data restoring unit 831.

When receiving the demand to restore the data in the data file 812 from the system failure detecting unit 828, the data restoring unit 831 restores the data in the application area 814 in the data file 812 on the basis of the restoration data stored in the recovery information unit 815.

The data restoring unit 831, according to this embodiment, comprises a restoration data effectiveness detecting unit 832 and a restoration data writing unit 833.

The restoration data effectiveness detecting unit 832 judges that the restoration data is effective when the check serial numbers attached before and after the restoration data are in agreement. The restoration data writing unit 833 writes the unupdated data of the restoration data having been judged to be effective by the restoration data effectiveness detecting unit 832 as the data at the record number of the above restoration data in the application area 814 of the data file 812.

Figure 11:
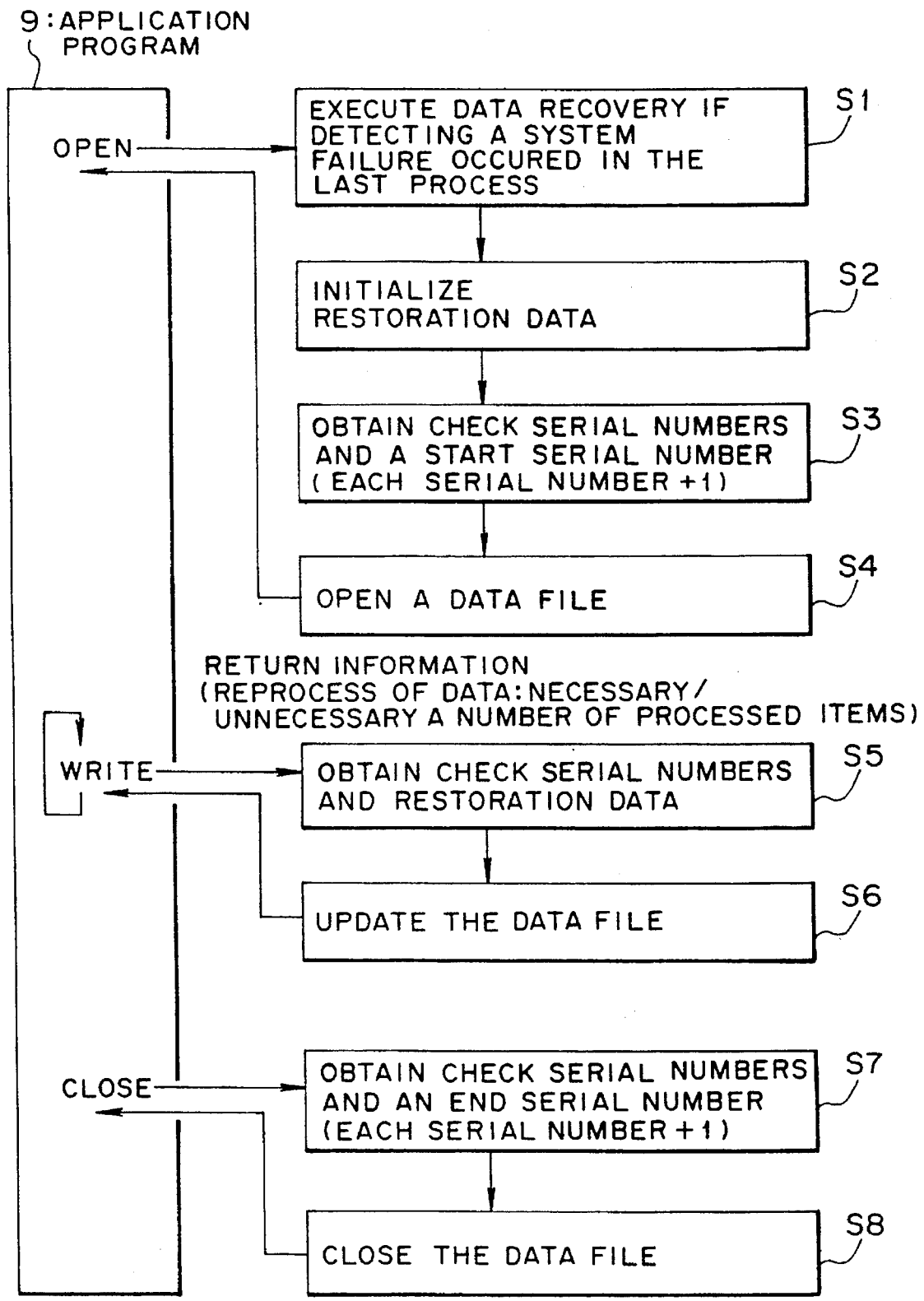
FIG. 11 is a flow chart of an operation to obtain recovery information in the card type storage medium according to the second embodiment.

According to this embodiment, the recovery information is acquired in the IC card 8 in a normal updating process instructed by the application program 9 through following procedure shown in FIG. 11.

When receiving an OPEN command from the application program 9, the system failure detecting unit 828 of the IC card 8 detects a failure that has occurred in the last process (Step S1).

If a system failure is not detected, or a system failure is detected and a recovery process (a data recovery process) is executed by the restoring unit 829–831, the restoration data initializing unit 827 initializes the restoration data that has been written in the recovery information unit 815 in the last process by setting all the restoration data at 0 and all the check serial numbers at 1 (Step S2). (Meanwhile, a manner for the system failure detecting and the data restoring will be described later, referring to FIG. 12.).

The start serial number obtaining unit 824 obtains a check serial number and a start serial number by adding 1 to the latest start serial number (whose initial value is 0) and the check serial numbers (whose initial value is 1), and writes the new start serial number and its check serial numbers attached before and after the start serial number as recovery information in the record number #n+1 in the recovery information unit 815 (Step S3).

Thereafter, the data file opening unit 821 opens the data file 812 designated by the open command on the basis of the control information in the directory area 813 in the storage unit 81 (Step S4).

After the data file 812 is opened, the restoration data obtaining unit 825 obtains restoration data including a record number to be updated and unupdated data at this record number every time the application program 9 supplies a WRITE command (an updating instruction), and writes the restoration data and its check serial numbers attached before and after the restoration data in the record number on and after #n+3 in the recovery information unit 815, in order (Step S5). In the case where the data file updating unit 822 executes the updating process plural times on the same record number between an open and close of the data file 812, the restoration data will not be written into the recovery information unit 815 after the second updating process and later.

After the restoration data obtaining unit 825 has obtained the restoration data, the data file updating unit 822 updates the data in the data file 812 (Step S6).

While the application program 9 supplies a WRITE command (an updating instruction), the process in the steps S5 and S6 is repeated.

When receiving a close command from the application program 9, the end serial number obtaining unit 826 obtains an end serial number and its check serial numbers by adding 1 to the latest end serial number (whose initial value is 0) and the check serial numbers (whose initial value is 1) as same as in the step S3. The end serial number with the check serial numbers attached before and after the end serial number are written into the record number #n+2 in the recovery information unit 815 as recovery information (Step S7).

Thereafter, the data file closing unit 823 closes the data file 812 (Step S8).

In the above manner, the recovery information is written in the recovery information additionally provided in the data file 812 in the file area 811 in the storage unit 81 every time the control unit causes the data file 812 to be updated.

Figure 12:
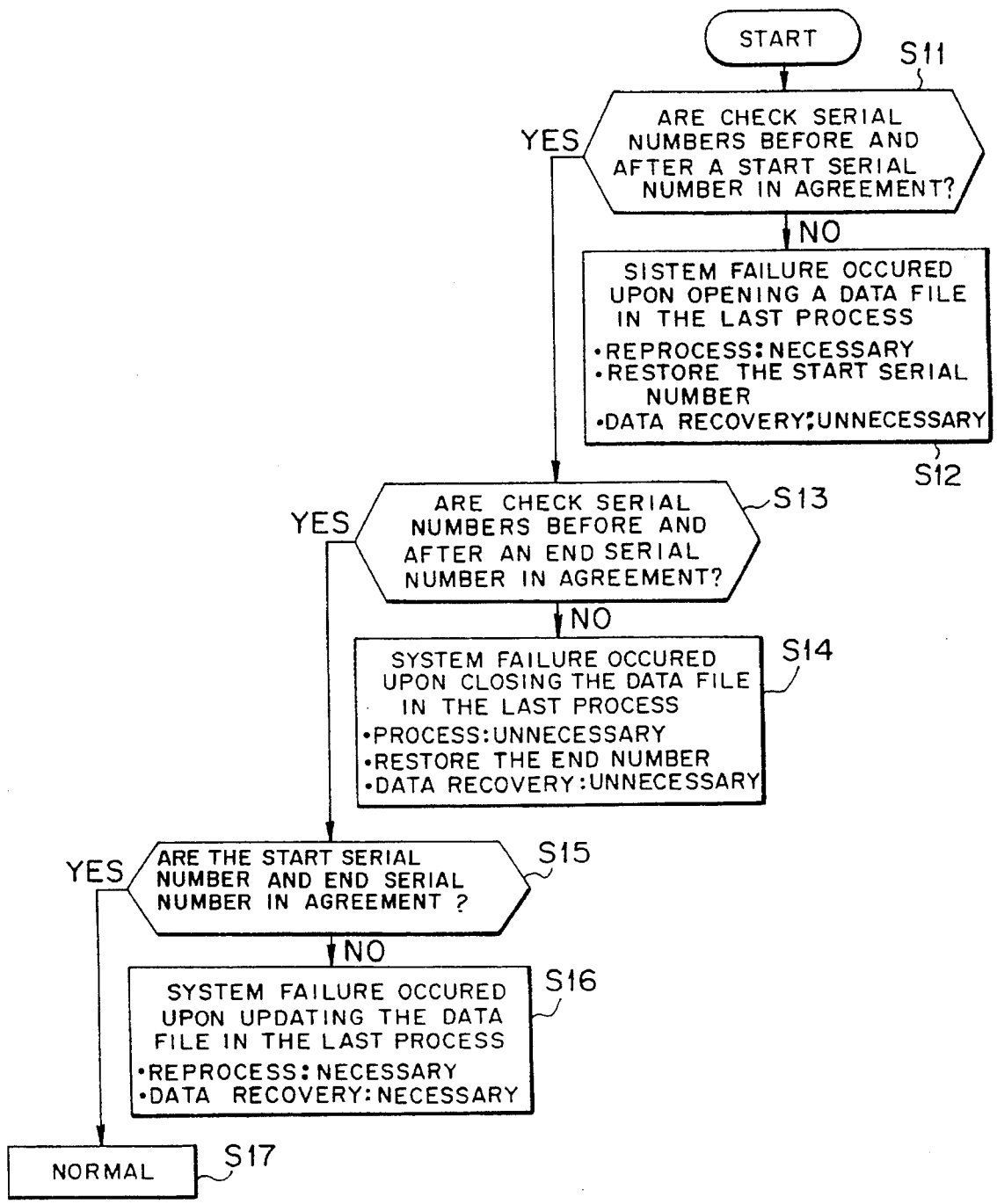
FIG. 12 is a flow chart of an operation to detect a system failure and restore data in the card type storage medium according to the second embodiment.

A manner to detect a system failure in the last process by the system failure detecting unit 828 and a restoring process (a data recovery process) when a system failure is detected in the IC card 8 carried out in Step 1 shown in FIG. 11 will be now described in more detail, referring to FIG. 12.

When receiving an OPEN command from the application program 9, a reference is made to the control information about a designated data file 812 in the directory area 813. If the data file 812 has a recovery information unit 815 therein, the system failure detecting unit 828 detects a system failure having occurred in the last process, on the basis of the recovery information (i.e., a start serial number, an end serial number and check serial numbers attached before and after the start serial number and the end serial number) stored in the recovery information unit 815.

Namely, a judgement is first made as to whether the check serial numbers attached before and after the start serial number are in agreement or not (Step S11). If the check serial numbers are in disagreement, it is judged that a system failure occurred when the data file was opened by the data file opening unit 821 in the last process, then a demand to reprocess the last process and a demand to restore the start serial number are outputted to the application program 9 and the start serial number restoring unit 829, respectively.

The start serial number restoring unit 829 restores the start serial number stored in the recovery information unit 815 to the one at the time of two updating processes earlier (Step S12). Then in the step S2 shown in FIG. 11, the application program 9 once more carries out the process that should have been done in the last process in response to the reprocessing demand from the system failure detecting unit 828.

On this occasion, since a system failure occurred when the data file was opened in the last process, it can be assumed that no updating process has been performed on the data file 812, and thus the restore data and end serial number in the recovery information unit 815. Therefore, only the start serial number is restored to the one at the time of two updating processes earlier without carrying out the data restoring (data recovery), and a demand for the reprocessing is given to the application program 9. As this, the program of the last process can be appropriately executed in the recovery information unit 815.

If it is judged in the Step S11 that the check serial numbers attached before and after the start serial number are in agreement, the next judgement is made as to whether the check serial numbers attached before and after the end serial number are in agreement or not (Step S13). If the check serial number attached before and after the end serial number are in disagreement, it is judged that a failure occurred when the data file was opened by the data file opening unit 823 in the last process, and a demand to restore the end serial number is outputted to tile end serial number restoring unit 830.

The end serial number restoring unit 830 then restores the end serial number stored in the recovery information unit 815 to the one at the time of the last process (Step S14). Then the procedure advances to the step S2 in FIG. 11, the application program 9 carried out the process of this time.

On this occasion, since a failure occurred when the data file was closed in the last process, it can be assumed that the data file 812, and the start serial number and the restoration data in the recovery information unit 815 have been properly updated in the last process. Therefore, it is possible to execute the process of this time with a proper recovery information unit 25 only if the end serial number is restored to the one at the time of the last process.

If it is judged in the step S13 that the check serial numbers attached before and after the end serial number is in agreement, the next judgement is made as to whether the start serial number and the end serial number are in agreement or not (Step S15). If in disagreement, it is judged that a failure has occurred during the data file updating operation carried out by the data file updating unit 822 in the last process, then a demand to reprocess the last process and a demand to restore the data in the data file 812 are outputted to the application program 9 and the data restoring unit 831, respectively.

When receiving a command to restore the data in the data file 812 from the system failure detecting unit 828, the data restoring unit 831 restores the data in the application area 814 in the data file 812 on the basis of the restoration data stored in the recovery information unit 815 (Step S16). The procedure then advances to the step S2 in FIG. 11, where the application program 9 carries out once more the operation that should have been done in the last process.

On this occasion, since a failure has occurred during the updating process in the last process, the application area 814 in the data file 812 is restored to the state at the time of two updating processes earlier (the state before the failure has occurred), then a reprocess is demanded to the application program 9, thereby reexecuting the last process on the data file 22 that is in a state at the time of two updating processes earlier.

When the data restoring unit 831 restores the data, the restoration data writing unit 833 writes only the restoration data whose check serial numbers attached before and after the same have been judged by the restoration data effectiveness detecting unit 832 to be in agreement into the data file 812.

It is therefore possible to restore the data without using the restoration data (whose check serial numbers are in disagreement) that a system failure has occurred in the course of writing the same in the last process.

In the case where the start serial number is in agreement with the end serial number in the step S15, it is judged to be normal (Step S17), the procedure advances to the step S2 in FIG. 11, where the process of this time is executed by the application program 9.

Next, operation of the IC card according to this embodiment will be described referring to FIGS. 13 through 16, where a content of practical data in the recovery information unit 815 is shown to explain the operation.

The recovery information unit 815 immediately after the issue of the IC card 8 is in a state where the start serial number, the end serial number and the restoration data are all set at 0, and the check serial numbers attached before and after the start serial number, the end serial number and the restoration data are all set at 1, as shown in FIG. 13A.

Assuming that a WRITE instruction for, for example, the record numbers #10, #8 and #11 of the data file 812 from the application program 9 is successively executed between an open and close of the data file 812 without a break due to a system failure, in the first updating process done on the IC card 8.

In which case, the start serial number obtaining unit 821 and the end serial number obtaining unit 823 obtain "1" and "1" as a start serial number and an end serial number, respectively, to write them into the recovery information unit 815. At the same time, the restoration data obtaining unit 825 also obtains, for example, "#10,3030", "#08,F1F1" and "#11,1010" as restoration data, and writes them into the recovery information unit 815. Before and after each data, check serial numbers "2" are attached, as shown in FIG. 13B.

Here, "3030", "F1F1" and "1010" in the restoration data are unupdated data at the record numbers #10, #08 and #11 in the application area 814.

Thereafter, the restoration data initializing unit 827 initializes to make all the restoration data to be "0" and their check serial numbers to be "1" when the second updating process is performed on the IC card 8. Assuming that after the initialization has been executed by the restoration data initializing unit 827, a WRITE instruction is successively executed two times on the record number #02 of the data file 812, and this updating process is executed between an open and close of the data file 812, without a break due to a system failure.

In which case, the start serial number obtaining unit 821 and the end serial number obtaining unit 823 obtain "2" and "2" as a start serial number and an end serial number, respectively, and write them into the recovery information unit 815. At the same time, the restoration data obtaining unit 825 obtains, for example "#02,4040" as restoration data, and also writes it into the recovery information unit check serial numbers "3" are attached before and after the start serial number, the end serial number and the restoration data, and also written into the recovery information unit 815.

In the case where updating process is executed a plurality of times on the same record number in the between an open and close of the data file 812, the restoration data obtaining unit 825 does not write the restoration data into the recovery information unit 815 after the second process and later. "4040" written as unupdated data of the restoration data is the first unupdated data in relation to the record number #02" in the application area 814.

Figure 14:
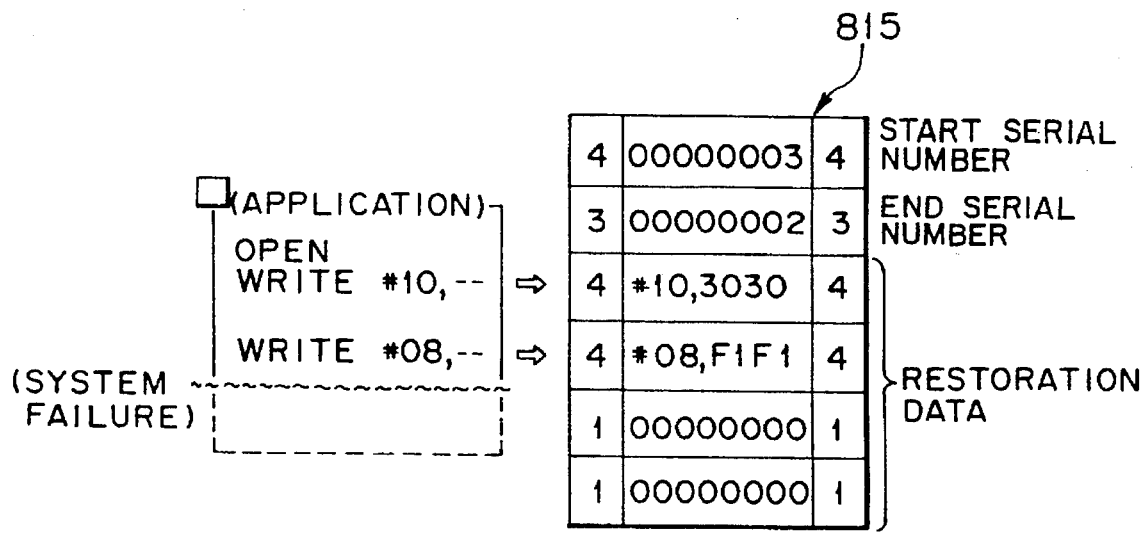
FIG. 14 is an illustration of a content of data in the recovery information unit in order to explain the operation of the card type storage medium according to the second embodiment.

On the third updating process done on the IC card 8, the restoration data initializing unit 827 first executes initialization. The application program 9 next gives a WRITE instruction for, for example, the record number #10 and #08 in the data file 812. Now assuming that a system failure occurred after restoration data in connection with the record number #08 was obtained, as shown in FIG. 14.

In which case, the start serial number obtaining unit 821 obtains a start serial number "3" and its check serial numbers "4", and writes them into the recovery information unit 815. The end serial number obtaining unit 823, however, cannot obtain an end serial number and its check serial numbers since a system failure has occurred before receiving a CLOSE instruction. As a result, the end serial number "2" and the check serial number "3" at the time of the last process remain in the recovery information unit 815.

The restoration data obtaining unit 825 obtains, for example, "#10,3030" and "#08,F1F1" as restoration data, and successively writes them with their check serial numbers "4" into the recovery information unit. The updating process is terminated.

If the application program 9 executes an updating process on the IC card 8 under the above condition, the system failure detecting unit 828 operates in response to an OPEN instruction from the application program 9, and makes a judgement that a system failure has occurred during the last updating process since the check serial number attached before and after the start serial number and the check serial numbers attached before and after the end serial number are individually in agreement but the start serial number and the end serial number are in disagreement (referring to Step S15 in FIG. 12). The system failure detecting unit 828 thus outputs a demand to perform a reprocess to the application program 9 and a demand to restore the data in the data file 812 to the data restoring unit 831 (referring to the Step 16 in FIG. 12).

When the data restoring unit 831 restores the data, the restoration data effectiveness detecting unit 832 verifies the effectiveness of restoration data from whether check serial numbers attached before and after the restoration data are in agreement or not. In the example shown in FIG. 14, the check serial numbers attached before and after two restoration data are all "4", being thus in agreement. The two restoration data are thus judged to be effective. The restoration data writing unit 833 writes the restoration data "3030" and "F1F1" into the respective record numbers #10 and #08 in the application area 814 in the data file 812 on the basis of the above two restoration data whose effectiveness has been verified.

Figure 15:
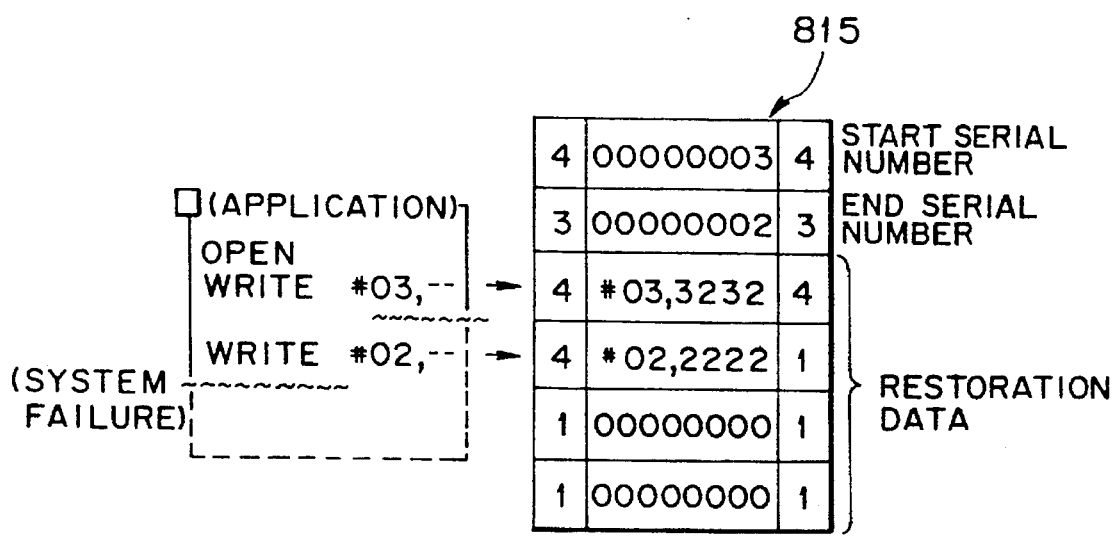
FIG. 15 is an illustration of a content of data in the recovery information unit in order to explain the operation of the card type storage medium according to the second embodiment.
Figure 17:
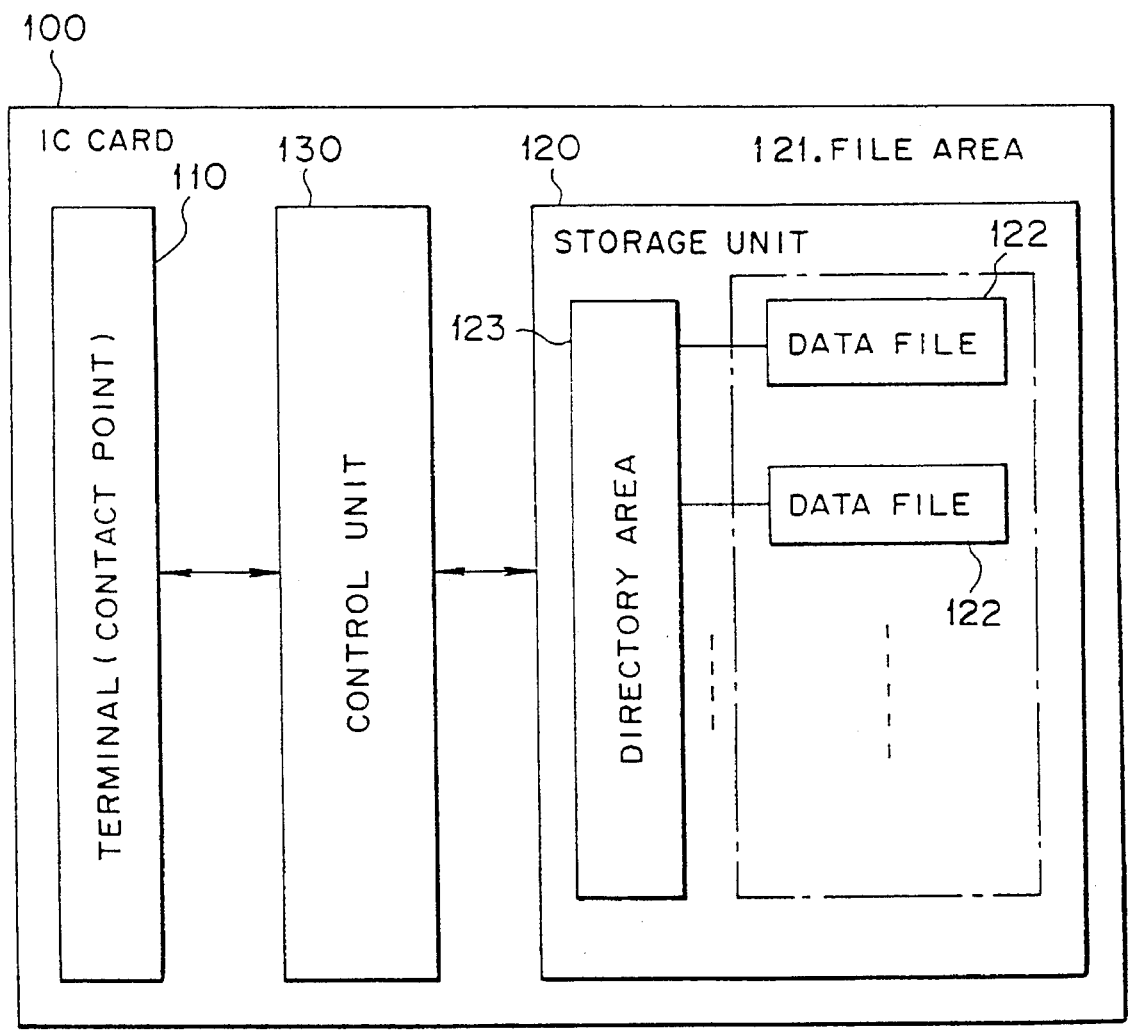
FIG. 17 is a block diagram showing a configuration of a typical IC card.
Figure 18:
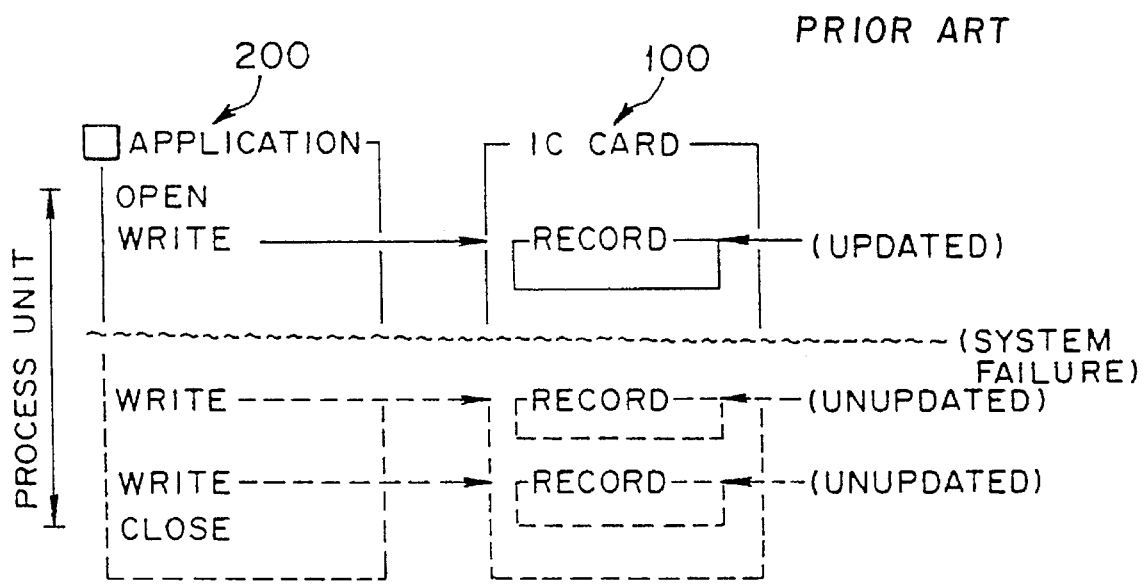
FIG. 18 is an illustration showing a state of data stored in an IC card when a system failure occurred.
Figure 19:
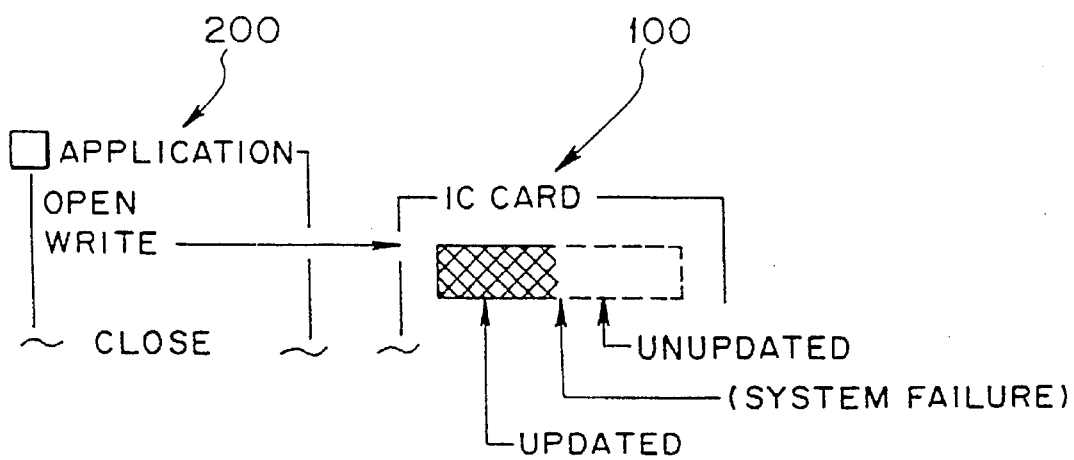
FIG. 19 is an illustration showing a state of data stored in an IC card when a system failure occurred.

On the contrary, assuming that upon performing the third updating process on the IC card 8, a WRITE instruction from the application program 9 is executed on the record numbers, for example, #03 and #02 in the data file 812, and a system failure occurs while the restoration data in connection to the record number #2 is being obtained, as shown n FIG. 15.

In which case, the start serial number obtaining unit 821 obtains a start serial number "3" and its check serial numbers "4", and write them into the recovery information unit 815. The end serial number obtaining unit 823, however, cannot obtain an end serial number and its check serial numbers since a system failure has occurred before receiving a CLOSE instruction. As a result, the end serial number "2" and the check serial number "3" at the time of the last process remain in the recovery information unit 815.

The restoration data obtaining unit 825 obtains "#03, 3232" as restoration data and its check serial numbers "4". However, since a system failure has occurred in the course of obtaining "#02,2222" as the second restoration data, check serial numbers "4" are attached before the restoration data "#02,2222" while check serial numbers "3" attached after the restoration data in the last process still remains even at the end of the process.

Under such condition, if an updating process is executed on the IC card 8 from the application program 9, the system failure detecting unit 828 operates in response to an OPEN instruction from the application program 9, and makes a judgement that a system failure has occurred during the last updating process since a check serial number attached before and after the start serial number and a check serial number attached before and after the end serial number are individually in agreement, but the start serial number and the end serial number are in disagreement (referring to the step 15 in FIG. 12). The system failure detecting unit 828 thus outputs a demand to once more perform the last process to the application program 9 besides a demand to restore the data in the data file 812 to the data restoring unit 831, as same as in the example shown in FIG. 14 (referring to the Step S16 in FIG. 12).

Here, when the data restoring unit 831 restores the data, the restoration data effectiveness detecting unit 832 verifies the effectiveness of the restoration data by making a judgement as to whether the check serial numbers attached before and after the restoration data are in agreement or not. In the example shown in FIG. 15, the check serial numbers attached before and after the first restoration data are both "4", being thus in agreement. But, the check serial numbers attached before and after the second restoration data are "4" and "3", being thus in disagreement.

For this, the first restoration data is judged to be effective, but it is judged that a system failure has occurred in the course of obtaining the second restoration data so that the updating process on the record number #02 in the application area 814 has not been completed. Therefore, the restoration data writing unit 833 conducts the writing on the basis only the first restoration data.

Through the above process, it is possible to restore the application area 814 to a state before a system failure has occured from a state of the system failure as shown in FIG. 16B, by writing the restoration data "3232" to the record number #3 in the application area 814 of the data file 812, respectively.

As above, according to the second embodiment of this invention, a start serial numbers and an end serial number in the recovery information unit 815 are compared with each other. If the start serial number and the end serial number are in disagreement, it is possible to detect that a system failure has occurred in the course from an open to close of the data file 812 check serial numbers attached before and after each data in the recovery information unit 815 are also compared with each other. If the check serial numbers are in disagreement, it is possible to detect that a system failure occurred in the course of writing the start serial number, the restoration data or the end serial number into the recovery information unit 815, further detect effectiveness of each data stored in the recovery information unit 815 and conflicting data generated due to the system failure without using a BCC, with certainty.

Before the restoration data has been obtained by the restoration data obtaining unit 825 is written into the recovery information unit 815, the restoration data of the last process stored in the recovery information unit 815 is initialized by the restoration data initializing unit 827. This initializing operation can prevent the restoration data of the last process from remaining in the recovery information unit when the new restoration data is written in the recovery information unit, and also can surely avoid to erroneously detect a system failure.

In the case where the data file updating unit 822 executes updating process more than once on the same record number between an open and close of the data file 812, the restoration data obtaining unit 825 does not write the restoration data in the recovery information unit 815 after the second updating and later, whereby it is possible to always hold the data before the data file is opened (i.e., the data before the updating) as the restoration data in the recovery information unit 815 at the same record number. Therefore, the state within the IC card 8 after the system failure has occurred can be effectively restored to the state before the system failure has occurred, on the basis of the data in the recovery information unit 815.

Since information about the presence of the recovery information unit 815 and information about a relative position of the recovery information unit 815 in a data file if the recovery information unit 815 exists in the data file are both set in the directory area 813 in the storage unit 81, it is possible to make a judgement as to whether predetermined data should be written into the recovery information unit 815 or data should be restored on the basis of the data stored in the recovery information unit, only by referring to the directory area 813 in the storage unit 81 from the control unit 82.

If the data file 812 has the recovery information unit therein, the system failure detecting unit 828 detects a system failure that has occurred in the last process, on the basis of the start serial number, the end serial number and the check serial numbers attached before and after the start serial number and the end serial number in the recovery information unit 815, in response to an OPEN instruction form the application program 9. This enables an automatic detection of conflicting data occurring due to a system failure within the IC card 8 without using a BCC.

According to a result of detection carried out by the system failure detecting unit 828, the start serial number restoring unit 829, the end serial number restoring unit 830 and the data restoring unit 831 can automatically repair and restore the recovery information unit 815 or the application area 814, whereby a configuration of the system can be simplified and inconvenience to the owner upon restoring the data can be mitigated to a considerable degree.

When the data restoring unit 813 repairs the data, the restoration data writing unit 833 writes only the effective restoration data whose check serial numbers attached before and after the same have been judged to be in agreement by the restoration data effectiveness judging unit 832 into the application area 814 in the data file 812. In consequence, it is possible to restore, certainly and effectively, the data in the application area 814 to the state before a system failure has occurred, without using restoration data that the system failure has occurred in the course of the writing (i.e., data whose check serial numbers are in disagreement).

In the IC card 8 according to the second embodiment, a terminal used to send and receive information to and from the outside (a contact and a data communication mechanism) is omitted in the drawings.

In the second embodiment state above, there is no need to add the recovery information unit 815 to all data file 812. As shown in FIG. 9, it is possible to omit the recovery information unit 815 in the data file 812 that needs no data recovery.

In the second embodiment, description has been made by way of an IC card as a card type storage medium. This invention is, however, not limited to the above examples, but adaptable to another type of card type storage medium, for example, an optical card, bringing the same effect as the above examples.

It is also possible to form a card type storage medium having a function of the IC card 6 according to the first embodiment, along with a function of the IC card 8 according to the second embodiment. In which case, the advantages of the above two embodiments can be realized in one card type storage medium.

What is claimed is:

1. A card type storage medium comprising a storage unit having a file area holding data in each file as a unit and a directory area holding therein control information about each data file in said file area and a control unit managing data in Said file area in said storage unit on the basis of said control information held in said directory area in said storage unit, said control unit executing updating on a data file in response to an instruction supplied from outside, the improvement comprising:

a recovery information unit provided in a data file in said file area in said storage unit, into which recovery information obtained every time said control unit updates the data file is written;

a start serial number obtained when the data file is opened and an end serial number obtained when the data file is closed are written as recovery information into said recovery information unit.

2. A card type storage medium according to claim 1, wherein restoration data including a record number to be updated and unupdated data at said record number obtained when the data file is updated are written as recovery information into said recovery information unit.

3. A card type storage medium according to claim 2, wherein check serial numbers are attached before and after the start serial number, the restoration data and the end serial number, respectively, as recovery information in said recovery information unit.

4. A card type storage medium according to claim 1, wherein when updating is executed plural times on the same record number between an open and close of a data file, restoration data is not written into said recovery information unit on and after the second updating.

5. A card type storage medium according to claim 2, wherein when updating is executed plural times on the same record number between an open and close of a data file, restoration data is not written into said recovery information on and after the second updating.

6. A card type storage medium according to claim 3, wherein when updating is executed plural times on the same record number between an open and close of a data file, restoration data is not written into said recovery information on and after the second updating.

7. A card type storage medium according to claim 1, wherein information about the presence of a recovery information unit in a data file and information about a relative position of said recovery information unit in the data file if said recovery information unit exists in the data file are set in said control information of the data file in said directory area in said storage unit.

8. A card type storage medium according to claim 2, wherein information about the presence of a recovery information unit in a data file and information about a relative position of said recovery information unit in the data file if said recovery information unit exists in the data file are set in said control information of the data file in said directory area in said storage unit.

9. A card type storage medium according to claim 3, wherein information about the presence of a recovery information unit in a data file and information about a relative position of said recovery information unit in the data file if said recovery information unit exists in the data file are set in said control information of the data file in said directory area in said storage unit.

10. A card type storage medium according to claim 4, wherein information about the presence of a recovery information unit in a data file and information about a relative position of said recovery information unit in the data file if said recovery information unit exists in the data file are set in said control information of the data file in said directory area in said storage unit.

11. A card type storage medium according to claim 5, wherein information about the presence of a recovery information unit in a data file and information about a relative position of said recovery information unit in the data file if said recovery information unit exists in the data file are set in said control information of the data file in said directory area in said storage unit.

12. A card type storage medium according to claim 6, wherein information about the presence of a recovery information unit in a data file and information about a relative position of said recovery information unit in the data file if said recovery information unit exists in the data file are set in said control information of the data file in said directory area in said storage unit.

13. A card type storage medium comprising a storage unit having a file area holding data in each file as a unit and a directory area holding control information about each data file in said file area and a control unit managing data in said file area in said storage unit on the basis of the control information in said directory area in said storage unit, said control unit comprising a data file opening means opening a data file in said file area in said storage unit according to an opening instruction supplied from outside on the basis of the control information in said directory area in said storage unit in response to the opening instruction, a data file updating means updating data held in a data file having been opened by said data file opening means in response to an updating instruction supplied form the outside after the data file has been opened, and a data file closing means closing the data file having been opened by said data file opening means in response to a closing instruction supplied from the outside after the data file has been opened, the improvement comprising:

a recovery information unit provided in a data file in said file area in said storage unit, said recovery information unit holding therein recovery information obtained every time said control unit updates the data file;

said control unit further comprising;

a start-serial number obtaining means obtaining a start serial number when said data file opening means opens a data file to write the start serial number as recovery information into said recovery information unit; and an end serial number obtaining means obtaining an end serial number when said data file closing means closes the data file to write the end serial number as recovery information into said recovery information unit.

14. A card type storage medium according to claim 13, wherein said control unit further comprises a restoration data obtaining means obtaining restoration data including a record number to be updated and unupdated data at said record number when said data file updating means updates said data file to write it as recovery information into said recovery information unit.

15. A card type storage medium according to claim 14, wherein when said start serial number obtaining means, said restoration data obtaining means and said end serial number obtaining means obtain a start serial number, restoration data and an end serial number, respectively, check serial numbers are attached as recovery information before and after said start serial number, restoration data and end serial number, respectively, and are written into said recovery information unit.

16. A card type storage medium according to claim 13, wherein said control unit further comprises a restoration data initializing means initializing restoration data that has been written in said recovery information unit in the last process, before new restoration data obtained by said restoration data obtaining means is written into said recovery information unit.

17. A card type storage medium according to claim 15, wherein said control unit further comprises a restoration data initializing means initializing restoration data that has been written in said recovery information unit in the last process, before new restoration data obtained by said restoration data obtaining means is written into said recovery information unit.

18. A card type storage medium according to claim 13, wherein if said data file updating means executes updating plural times on the same record number in the course from an open to close of a data file, said restoration data obtaining means avoids writing restoration data into said recovery information unit after the second updating and later.

19. A card type storage medium according to claim 17, wherein, if said data file updating means executes updating plural times on the same record number in the course from an open to close of a data file, said restoration data writing restoration data into said recovery information unit after the second updating and later.

20. A card type storage medium according to claim 13, wherein information about the presence of a recovery information unit in a data file and information about a relative position of said recovery information unit in the data file if said recovery information exists in the data file are set in the control information of each data file in said directory area in said storage unit.

21. A card type storage medium according to claim 19, wherein information about the presence of a recovery information unit in a data file and information about a relative position of said recovery information unit in the data file if said recovery information exists in the data file are set in the control information of each data file in said directory area in said storage unit.

22. A card type storage medium according to claim 20, wherein said control unit further comprises a failure detecting means, in response to an open instruction to open a data file supplied from outside, referring to control information about said data file held in said directory area in said storage unit, if said data file has a recovery information unit, said failure detecting means detecting a failure that has occurred in the last process on the basis of a start serial number, an end serial number and check serial numbers attached before and after the start serial number and end serial number, respectively, written in said recovery information unit as recovery information.

23. A card type storage medium according to claim 21, wherein said control unit further comprises a failure detecting means, in response to an open instruction to open a data file supplied from outside, referring to control information about said data file held in said directory area in said storage unit, if said data file has said recovery information unit, said failure detecting means detecting a failure that has occurred in the last process on the basis of a start serial number, an end serial number and check serial numbers attached before and after the start serial number and end serial number, respectively, written in said recovery information unit as recovery information.

24. A card type storage medium according to claim 22, wherein said failure detecting means makes a judgement that a failure occurred when said data file opening means opened a data file in the last process if check serial numbers attached before and after a start serial number of said data file are in disagreement.

25. A card type storage medium according to claim 23, wherein said failure detecting means makes a judgement that a failure occurred when said data file opening means opened a data file in the last process if check serial numbers attached before and after a start serial number of said data file are in disagreement.

26. A card type storage medium according to claim 24, wherein said failure detecting means outputs a demand to reprocess the last process and a demand to restore the start serial number if said failure detecting means detects the a failure occurred when the data file was closed in the last process.

27. A card type storage medium according to claim 25, wherein said failure detecting means outputs a demand to reprocess the last process and a demand to restore the start serial number if said failure detecting means detects that a failure occurred when the data file was opened in the last process.

28. A card type storage medium according to claim 26, wherein said control unit further comprises a start serial number restoring means restores, in response to a restoring demand to restore a start serial number supplied form said failure detecting means, said start serial number written in said recovery information unit into a start serial number at the time of two processes earlier.

29. A card type storage medium according to claim 27, wherein said control unit further comprises a start serial number restoring means restores, in response to a restoring demand to restore a start serial number supplied form said failure detecting means, said start serial number written in said recovery information unit into a start serial number at the time of two processes earlier.

30. A card type storage medium according to claim 22, wherein said failure detecting means makes a judgement that a failure occurred when said data file closing means closed a data file if check serial numbers attached before and after a start serial number of said data file are in agreement but check serial numbers attached before and after an end serial number of said data file are in disagreement.

31. A card type storage medium according to claim 23, wherein said failure detecting means makes a judgement that a failure occurred when said data file closing means closed a data file if check serial numbers attached before and after a start serial number of said data file are in agreement but check serial numbers attached before and after an end serial number of said data file are in disagreement.

32. A card type storage medium according to claim 30, wherein said failure detecting means outputs a demand to restore the end serial number of the data file if said failure detecting means detects that a failure occurred when said data file was closed in the last process.

33. A card type storage medium according to claim 31, wherein said failure detecting means outputs a demand to restore the end serial number of the data file if said failure detecting means detects that a failure occurred when said data file was closed in the last process.

34. A card type storage medium according to claim 32, wherein said control unit further comprises an end serial number restoring means restores, in response to a demand to restore an end serial number of a data file supplied from said failure detecting means, the end serial number written in said recovery information unit to an end serial number at the time of the last process.

35. A card type storage medium according to claim 33, wherein said control unit further comprises an end serial number restoring means restores, in response to a demand to restore an end serial number of a data file supplied from said failure detecting means, the end serial number written in said recovery information unit to an end serial number at the time of the last process.

36. A card type storage medium according to claim 22, wherein said failure detecting means makes a judgement that a failure occurred when said data file updating means updated a data file if check serial numbers attached before and after a start serial number of the data file and check serial numbers attached before and after an end serial number of the same are individually in agreement but the start serial number and the end serial number are in disagreement.

37. A card type storage medium according to claim 23, wherein said failure detecting means makes a judgement that a failure occurred when said data file updating means updated a data file if check serial numbers attached before and after a start serial number of the data file and check serial numbers attached before and after an end serial number of the same are individually in agreement but the start serial number and the end serial number are in disagreement.

38. A card type storage medium according to claim 26, wherein when said failure detecting means detects a failure that has occurred during the last updating process of a data file, said failure detecting means outputs a demand to reprocess the last process and a demand to restore data in said data file.

39. A card type storage medium according to claim 27, wherein when said failure detecting means detects a failure that has occurred during the last updating process of a data file, said failure detecting means outputs a demand to reprocess the last process and a demand to restore the data in said data file.

40. A card type storage medium according to claim 38, wherein said control unit further comprises a data restoring means restores, in response to a demand to restore data in a data file supplied from said failure detecting means, said data in said data file on the basis of restoration data stored in said recovery information unit.

41. A card type storage medium according to claim 39, wherein said control unit further comprises a data restoring means restores, in response to a demand to restore data in a data file supplied from said failure detecting means, said data in said data file on the basis of restoration data stored in said recovery information unit.

42. A card type storage medium according to claim 40, wherein said data restoring means comprises:

a restoration data effectiveness detecting means making a judgement that restoration data is effective if check serial numbers attached before and after said restoration data are in agreement; and a restoration data writing means writing unupdated data of restoration data that has been judged to be effective by said restoration data effectiveness detecting means as data at a record number of said restoration data into a data file.

43. A card type storage medium according to claim 41, wherein said data restoring means comprises:

a restoration data effectiveness detecting means making a judgement that restoration data is effective if check serial numbers attached before and after said restoration data are in agreement; and a restoration data writing means writing unupdated data of restoration data that has been judged to be effective by said restoration data effectiveness detecting means as data at a record number of said restoration data into a data file.

* * * * *